US012583362B2

(12) United States Patent (10) Patent No.: US 12,583,362 B2
Takaki et al. (45) Date of Patent: Mar. 24, 2026

(54) AGRICULTURAL TRACTOR

(71) Applicant: Kubota Corporation, Osaka (JP)

(72) Inventors: Go Takaki, Sakai (JP); Takahiro Takaki, Sakai (JP); Kenichi Iwami, Sakai (JP); Tomoyoshi Sakano, Sakai (JP); Yuki Minamide, Sakai (JP); Kodai Amitani, Sakai (JP); Yosuke Hayashi, Sakai (JP); Teppei Ohnishi, Sakai (JP); Atsushi Morita, Sakai (JP); Isamu Kazama, Sakai (JP); Kenshiro Matsui, Sakai (JP); Kenji Ishihara, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/978,151

(22) Filed: Dec. 12, 2024

(65) Prior Publication Data

US 2025/0115166 A1 Apr. 10, 2025

Related U.S. Application Data

(63) Continuation of application No. PCT/JP2023/023492, filed on Jun. 26, 2023.

(30) Foreign Application Priority Data

Jun. 28, 2022 (JP) ................................. 2022-103777

(51) Int. Cl.
*B60L 58/33* (2019.01)
*B60L 50/71* (2019.01)

(52) U.S. Cl.
CPC ............... *B60L 58/33* (2019.02); *B60L 50/71* (2019.02)

(58) Field of Classification Search
CPC ...... B60L 2200/40; B60L 50/71; B60L 50/64; B60L 50/70; B60L 58/33; B60L 70/71; B60K 1/04; B60K 2001/0411; B60K 1/00
See application file for complete search history.

(56) References Cited

U.S. PATENT DOCUMENTS

| | | | | |
|---|---|---|---|---|
| 7,434,611 | B2 * | 10/2008 | Wunderlich | ....... B60H 1/00428 237/12.3 A |
| 10,214,247 | B2 | 2/2019 | Watabe et al. | |
| 12,139,026 | B2 * | 11/2024 | Ono | ........................ B60L 50/66 |

(Continued)

FOREIGN PATENT DOCUMENTS

| | | |
|---|---|---|
| JP | 2002225577 A | 8/2002 |
| JP | 2013173428 A | 9/2013 |

(Continued)

OTHER PUBLICATIONS

Nakayama WO2020261849A1 English Translation and original document (Year: 2020).*

(Continued)

*Primary Examiner* — Paul N Dickson
*Assistant Examiner* — Caitlin Anne Miller
(74) *Attorney, Agent, or Firm* — Keating & Bennett, LLP

(57) ABSTRACT

An agricultural tractor includes a vehicle frame, and a front housing supported by the vehicle frame. The front housing includes, a fixed housing portion fixed to the vehicle frame, a movable housing portion supported by the vehicle frame or the fixed housing portion and being openable and closeable.

11 Claims, 22 Drawing Sheets

(56)     References Cited

U.S. PATENT DOCUMENTS

| 2017/0158242 | A1   | 6/2017   | Matsumoto et al. |
| 2021/0135255 | A1 * | 5/2021   | Sawada ................... B60L 58/34 |
| 2022/0379704 | A1 * | 12/2022  | Tottori ..................... B60K 1/00 |
| 2022/0379970 | A1 * | 12/2022  | Nakayama ............... B60K 1/04 |
| 2023/0019714 | A1 * | 1/2023   | Takaki ............. B60K 15/03006 |
| 2023/0104274 | A1   | 4/2023   | Umemoto et al. |

FOREIGN PATENT DOCUMENTS

| JP | 2017105254 | A  | 6/2017  |
| JP | 2020157924 | A  | 10/2020 |
| WO | 2020261849 | A1 | 12/2020 |
| WO | 2022038860 | A1 | 2/2022  |

OTHER PUBLICATIONS

Department of Energy Fact Sheet (Year: 2022).*
Advancements in Electric Vehicle Batteries, Sustainability, Roy H. (Year: 2022).*
International Search Report in PCT/JP2023/023492, mailed Aug. 8, 2023, 2 pages.

* cited by examiner

LEFT ←——→ RIGHT

RIGHT ⟷ LEFT

AGRICULTURAL TRACTOR

CROSS REFERENCE TO RELATED APPLICATIONS

This application claims the benefit of priority to Japanese Patent Application No. 2022-103777 filed on Jun. 28, 2022 and is a Continuation Application of PCT Application No. PCT/JP2023/023492 filed on Jun. 26, 2023. The entire contents of each application are hereby incorporated herein by reference.

BACKGROUND OF THE INVENTION

1. Field of the Invention

The present disclosure relates to work vehicles each including an electric motor and a fuel cell.

2. Description of the Related Art

In the field of motor vehicles, where the main purpose is to transport "people" or "objects," electric vehicles (EVs) are becoming increasingly popular. In these vehicles, the driving force (traction) is generated by an electric motor (hereinafter referred to as "motor") instead of an internal combustion engine.

On the other hand, there is a need to reduce the amount of carbon dioxide ($CO_2$) emitted by work vehicles, such as tractors used in agricultural fields, to realize a decarbonized society. Unlike typical automobiles, work vehicles such as tractors need to tow implements, which are work machines, to perform agricultural tasks such as plowing. Therefore, to achieve the electrification of work vehicles, there are issues to be solved that differ from those of passenger cars.

Japanese Laid-Open Patent Publication No. 2002-225577 discloses a tractor that includes a fuel cell (FC) power generation system and a motor, while maintaining the structure of a conventional engine-driven tractor with minimal alteration.

SUMMARY OF INVENTION

To realize a power generation system for work vehicles using fuel cells, it is necessary to have various components in addition to a fuel tank for storing fuel. However, work vehicles, unlike typical automobiles, have mechanical structures for towing, lifting, or rotating implements. Therefore, it is problematic to adopt the fuel cell power generation system configuration used in conventional electric vehicles "as is" for work vehicles.

Example embodiments of the present disclosure provide work vehicles each capable of solving one or more of such problems.

An agricultural tractor according to an example embodiment of the present disclosure includes a vehicle frame, and a front housing supported by the vehicle frame and including a fixed housing portion fixed to the vehicle frame, and a movable housing portion supported by the vehicle frame or the fixed housing portion, the movable housing portion being openable and closeable.

According to example embodiments of the present disclosure, instead of an entirety of a front housing being openable and closable, rather a portion of the front housing functions as the fixed housing portion, while a remaining portion of the front housing can open/close as a movable housing portion. This configuration reduces the difficulty of opening and closing operations that may arise when the front housing becomes large, making it easier for operators to perform maintenance and other tasks.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
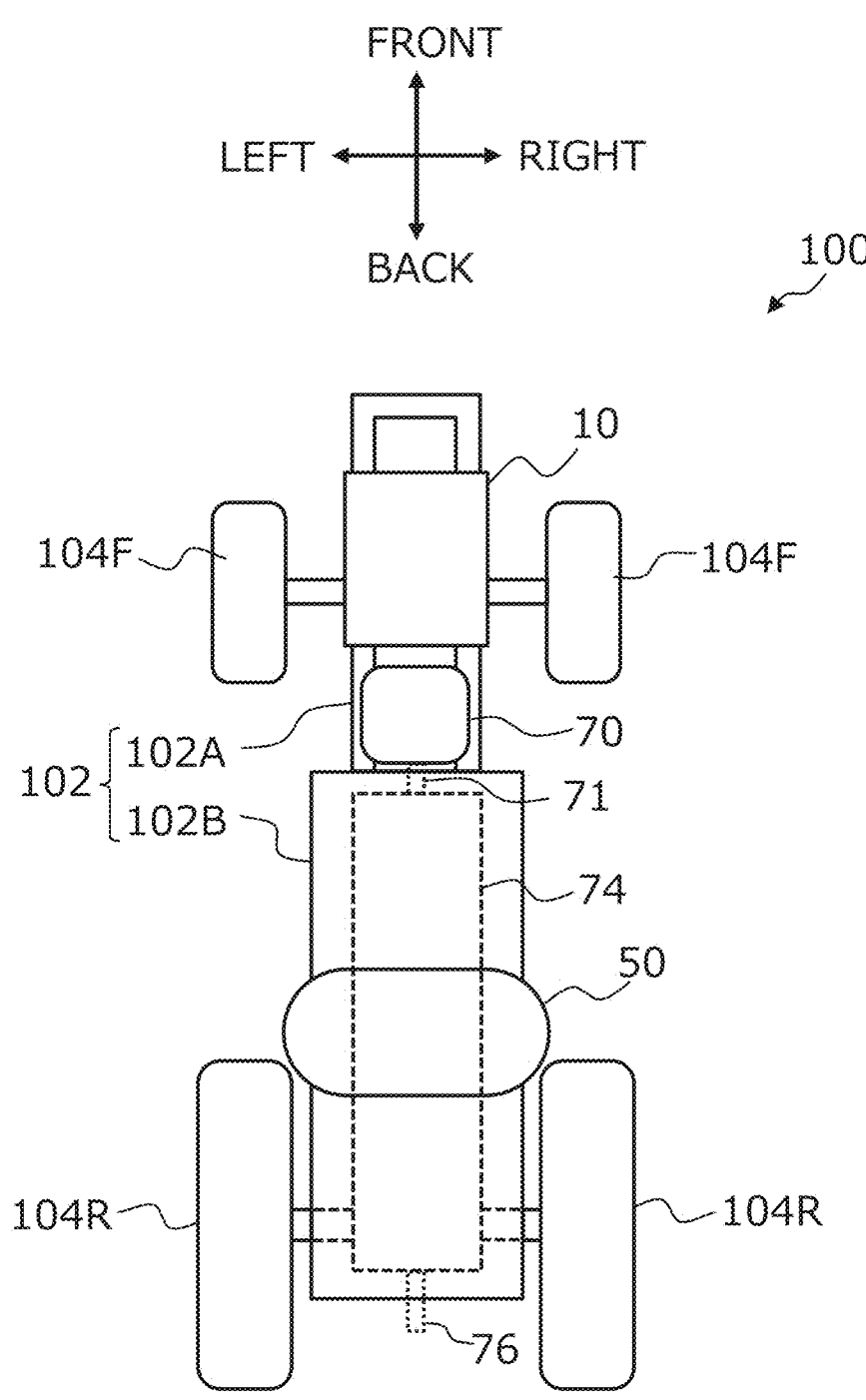
FIG. 1 shows a plan view schematically showing a basic configuration example of a work vehicle according to an example embodiment of the present disclosure.

The following describes example embodiments of the present disclosure. However, excessively detailed explanations may be omitted. For example, detailed explanations of well-known matters and repetitive explanations of substantially identical configurations may be omitted. This is to avoid the following description from becoming unnecessarily redundant and to facilitate understanding by those skilled in the art. The inventors provide the attached drawings and the following description to enable those skilled in the art to fully understand example embodiments of this disclosure, and do not intend to limit the subject matter described in the claims by these drawings and description. In the following description, the same reference numerals are used for components with the same or similar functions.

The following example embodiments are illustrative and not limiting. The technologies disclosed herein are not restricted to the following example embodiments. For instance, the numerical values, shapes, materials, steps, the order of those steps, screen layouts, and other elements shown in the following example embodiments are merely examples. Various modifications can be made as long as no technical contradictions arise. Additionally, different feature, elements, characteristics, etc., of the example embodiments may be combined as long as there are no technical contradictions.

In this disclosure, the term "work vehicle" refers to a vehicle used to perform a task at a work site. A "work site" includes any place where work is carried out, such as a field, forest, or construction site. A "field" refers to any place where agricultural work is performed, such as an orchard, farm, paddy field, grain farm, or pasture. A work vehicle may include an agricultural machine such as a tractor, rice planter, combine harvester, riding field management vehicle, or riding mower, as well as a non-agricultural vehicle such as a construction work vehicle or snowplow. The work vehicles according to example embodiments described in this disclosure may be equipped with an implement (also called a "work machine" or "work device") attached to at least one of its front and rear portions, depending on the nature of the work. Travel of a work vehicle while performing a task may be referred to as "tasked travel."

An "agricultural machine" refers to a machine for agricultural application. Examples of agricultural machines include tractors, harvesters, rice planters, riding field management vehicles, vegetable transplanters, mowers, seeders, spreaders, and agricultural mobile robots. Not only may a work vehicle such as a tractor function as an "agricultural machine" on its own, but also the entire combination of a work vehicle and an implement attached to or towed by the work vehicle may function as an "agricultural machine." An agricultural machine performs agricultural work on the ground in a field, such as tilling, seeding, pest control, fertilizing, planting crops, or harvesting.

Before explaining specific example embodiments of the work vehicles in this disclosure, an example of the basic configuration and operation of the work vehicle will be described. Each of the work vehicles according to example embodiments described below includes a motor and a fuel cell power generation system (hereinafter referred to as "FC power generation system") configured to generate the power necessary to drive the motor.

FIG. 1 is a schematic plan view showing an example of the basic configuration of a work vehicle 100 in this disclosure. In this disclosure, the direction in which the work vehicle 100 travels straight forward is called the "forward direction," and the direction in which it travels straight backward is called the "backward direction." In a plane parallel to the ground, the direction extending perpendicularly to the right of the "forward direction" is called the "right direction," and the direction extending perpendicularly to the left is called the "left direction." In FIG. 1, the "forward direction," "backward direction," "right direction," and "left direction" are indicated by arrows labeled "front," "back," "right," and "left" respectively. Both the forward and backward directions may be collectively referred to as the "front-back direction," and both the right and left directions may be collectively referred to as the "width direction."

The work vehicle 100 illustrated in this example is, for instance, a tractor, which defines and functions as an example of agricultural machinery. The technologies disclosed herein are not limited to work vehicles such as tractors and may be applied to other types of work vehicles. The work vehicle 100 is configured to attach or tow an implement and travel within a field while performing agricultural tasks appropriate to the type of implement. Additionally, the work vehicle 100 is configured to travel both within and outside the field (including on roads) with the implement raised or without an implement attached.

The work vehicle 100, like a conventional tractor, includes a vehicle frame 102 that rotatably supports left and right front wheels 104F and left and right rear wheels 104R. The vehicle frame 102 includes a front frame 102A, where the front wheels 104F are mounted, and a transmission case 102B, where the rear wheels 104R are mounted. The front frame 102A is fixed to the front portion of the transmission case 102B. The front wheels 104F and rear wheels 104R may be collectively referred to as wheels 104. Strictly speaking, the wheels 104 refer to wheel rims with tires attached. In this disclosure, the term "wheel" generally refers to the entire assembly of the "wheel rim and tire." Either or both of the front wheels 104F and rear wheels 104R may be replaced with a plurality of wheels (crawlers) fitted with endless tracks instead of wheeled tires.

In the example shown in FIG. 1, the work vehicle 100 includes a fuel cell module (FC module) 10 and a motor 70, which are directly or indirectly supported by the front frame 102A. The FC module 10 includes a fuel cell stack (FC stack) and functions as an onboard power generator that generates electricity from fuel, as will be described later. Hereinafter, the terms "FC module" or "FC stack" may simply be referred to as "fuel cell."

The motor 70 is electrically connected to the FC module 10. The motor 70 converts the electric power generated by the FC module 10 into mechanical motion (power) to produce the driving force (traction) necessary for the work vehicle 100 to travel. An example of the motor 70 is an AC synchronous motor. Since the FC stack of the FC module 10 generates direct current, when the motor 70 is an AC synchronous motor, a group of electrical circuits, including an inverter device, is installed between the FC stack and the motor 70 to convert the direct current to alternating current. A portion of such electrical circuit group may be inside the FC module 10, while another portion of the electrical circuit group may be attached to the motor 70 as a motor drive circuit.

The motor 70 includes an output shaft 71 that rotates. The torque of the output shaft 71 is transmitted to the rear wheels 104R through mechanical parts such as a transmission (gearbox) and a rear wheel differential gear device installed inside the transmission case 102B. In other words, the power generated by the motor 70, which defines and functions as the power source, is transmitted to the rear wheels 104R through a power transmission system (drivetrain) 74, including the transmission installed in the transmission case 102B. For this reason, the "transmission case" may also be referred to as a "mission case." In four-wheel drive mode, a portion of the power of the motor 70 is also transmitted to the front wheels 104F. The power of the motor 70 may be used not only to drive the work vehicle 100 but also to operate implements. Specifically, a power take-off (PTO) shaft 76 is provided at the rear end of the transmission case 102B, and the torque from the output shaft 71 of the motor 70 is transmitted to the PTO shaft 76. Implements attached to or towed by the work vehicle 100 is configured to receive power from the PTO shaft 76 to perform various work-related operations. The motor 70 and the power transmission system 74 may collectively be referred to as an electric powertrain.

Thus, the work vehicle 100 disclosed herein does not include an internal combustion engine such as a diesel engine, but includes the FC module 10 and the motor 70. Additionally, the output shaft 71 of the motor 70 is mechanically coupled to the power transmission system 74, including the transmission in the transmission case 102B. The motor 70 efficiently generates torque over a relatively wide range of rotational speeds compared to an internal combustion engine. However, by utilizing the power transmission system 74, including the transmission, it becomes easier to adjust the torque and rotational speed from the motor 70 over an even wider range by performing multi-stage or continuously variable speed change operations. This configuration allows for efficient execution of not only the travel of the work vehicle 100 but also various operations using implements.

Depending on the application or size of the work vehicle 100, some functions of the power transmission system 74 may be omitted. For example, a portion or an entirety of the transmission responsible for speed change functions may be omitted. The number and mounting position of motors 70 are also not limited to the example shown in FIG. 1.

The work vehicle 100 includes at least one fuel tank 50 that stores fuel to be supplied to the FC module 10. For simplicity, FIG. 1 shows one fuel tank 50. In some example embodiments, a plurality of fuel tanks 50 may be housed in a tank case to define a fuel tank module. The fuel tank 50 is supported by structural elements fixed to the vehicle frame 102A described later. The FC module 10 and the fuel tank 50 are connected by piping and open/close valves, and similar components, defining an FC power generation system mounted on a vehicle. The configuration and operation of the FC power generation system will be described later.

The work vehicle 100 in the example embodiments described later includes a seat for a driver, hereinafter referred to as "a driver seat," supported by the vehicle frame 102. The driver seat may be enclosed by a cabin supported by the vehicle frame 102. In the example embodiments described later, the FC module 10 is positioned in front of the driver seat, and the fuel tank 50 is positioned above the driver seat. Such FC module 10 and fuel tank 50 are housed in at least one "enclosure." The "enclosure" functions as a housing, for example, and plays a role in protecting the FC module 10 and fuel tank 50 from sunlight exposure and wind and rain. Additionally, such an enclosure is designed to control the spread of fuel gas into the atmosphere and to facilitate the detection of fuel gas when fuel gas leaks from the FC module 10 or fuel tank 50.

The FC module 10 may be housed in a front housing called a "bonnet," for example. The front housing is a portion of the "enclosure." The front housing is supported by the front portion of the vehicle frame 102 (front frame 102A). The fuel tank 50 is housed in a tank case, as mentioned earlier. The tank case is directly or indirectly supported by the vehicle frame 102.

Next, referring to FIG. 2, a basic configuration example of the FC power generation system 180 mounted on the work vehicle 100 will be explained.

Figure 2:
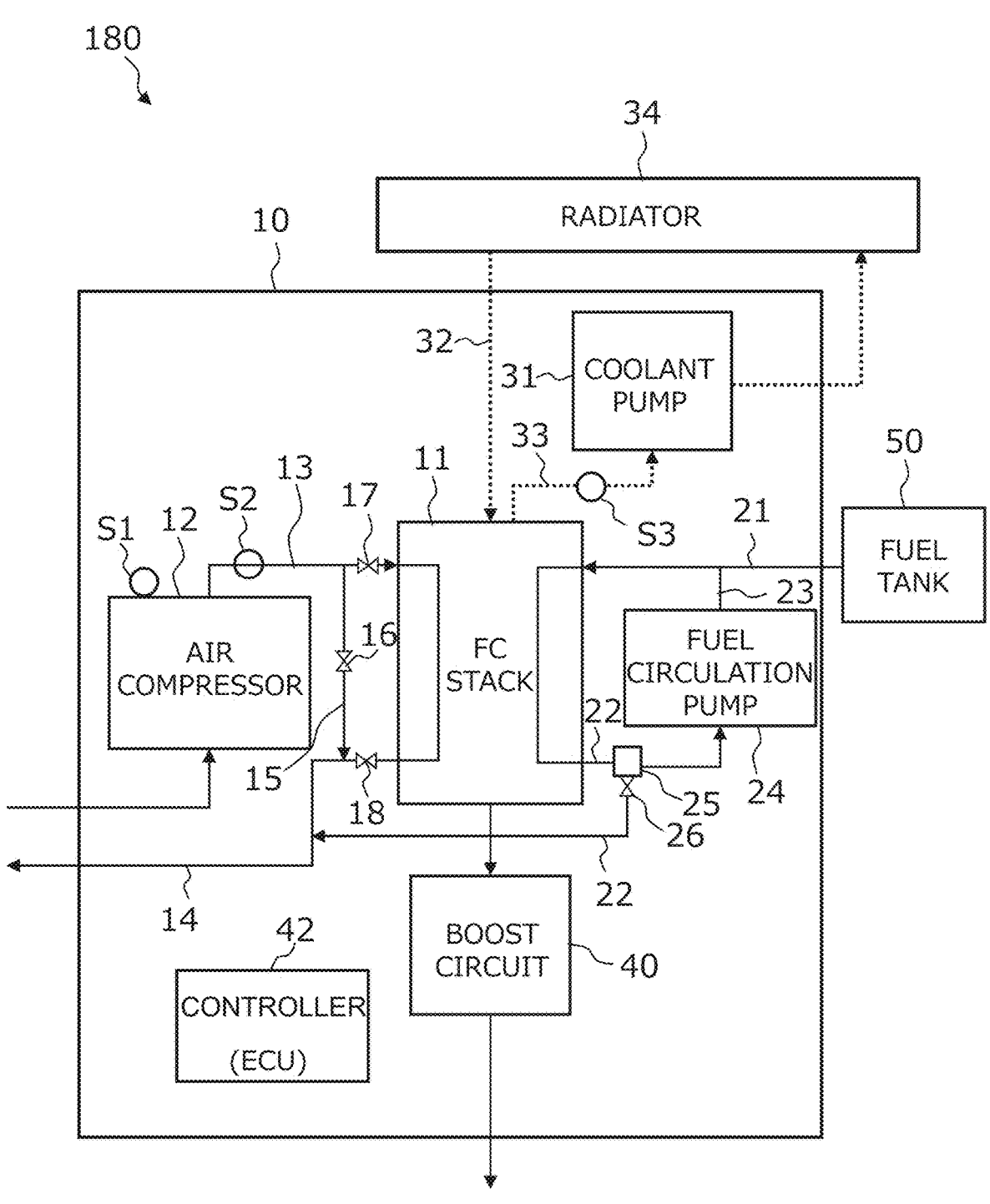
FIG. 2 shows a diagram showing a basic configuration example of a fuel cell power generation system mounted on a work vehicle according to an example embodiment of the present disclosure.

The FC power generation system 180 shown in FIG. 2 functions as an onboard power generation system in the work vehicle 100 of FIG. 1. The electric power generated by the FC power generation system 180 is used not only for the travel of the work vehicle 100 but also for the operation of implements towed or attached to the work vehicle 100.

The FC power generation system 180 in the illustrated example includes the FC module 10 and at least one fuel tank 50 that stores fuel to be supplied to the FC module 10. The FC power generation system 180 also includes a radiator device 34 for cooling the FC module 10.

The FC module 10 includes main components such as a fuel cell stack (FC stack) 11, an air compressor 12, a fuel circulation pump 24, a coolant pump 31, a boost circuit 40, and a controller 42. These components are housed within the casing of the FC module 10 and are connected to each other through electrical or fluid communication.

The FC stack 11 generates electric power through an electrochemical reaction between the fuel, referred to as "anode gas" and the oxidizing gas, referred to as "cathode gas." In this example, the FC stack 11 includes polymer electrolyte fuel cells. The FC stack 11 has a stack structure in which a plurality of single cells are stacked. A single cell includes, for example, an electrolyte membrane including an ion exchange membrane, an anode electrode on one side of the electrolyte membrane, a cathode electrode on the other side of the electrolyte membrane, and a pair of separators sandwiching the anode electrode and cathode electrode on both sides. The voltage generated in a single cell is, for example, less than 1 volt. Therefore, in the FC stack 11, for instance, more than 300 single cells are connected in series to generate a voltage of several hundred volts.

Anode gas is supplied to the anode electrode of the FC stack 11. The anode gas is called "fuel gas" or simply "fuel." In the example embodiments of this disclosure, the anode gas (fuel) is hydrogen gas. Cathode gas is supplied to the cathode electrode. The cathode gas is an oxidizing gas such as air. The anode electrode is called the fuel electrode, and the cathode electrode is called the air electrode.

At the anode electrode, the electrochemical reaction shown in the following equation (1) occurs.

$$2H_2 \rightarrow 4H^+ + 4e^- \qquad \text{equation (1)}$$

At the cathode electrode, the electrochemical reaction shown in the following equation (2) occurs.

$$4H^+ + 4e^- + O_2 \rightarrow 2H_2O \qquad \text{equation (2)}$$

Overall, the reaction shown in the following equation (3) occurs.

$$2H_2 + O_2 \rightarrow 2H_2O \qquad \text{equation (3)}$$

The anode gas after being used in the above reaction is called "anode off-gas", and the cathode gas after being used in the reaction is called "cathode off-gas."

The air compressor 12 supplies air taken from the outside as cathode gas to the cathode electrode of the FC stack 11. The cathode gas supply system including the air compressor 12 includes a cathode gas supply pipe 13, a cathode off-gas pipe 14, and a bypass pipe 15. The cathode gas supply pipe 13 flows cathode gas (air) supplied from the air compressor 12 to the cathode electrode of the FC stack 11. The cathode off-gas pipe 14 flows cathode off-gas discharged from the FC stack 11 to the outside air. The bypass pipe 15 branches from the cathode gas supply pipe 13 downstream of the air compressor 12, bypasses the FC stack 11, and connects to the cathode off-gas pipe 14. A control valve 16 is provided on the bypass pipe 15 to adjust the flow rate of cathode gas flowing through the bypass pipe 15. A shut-off valve 17 is provided on the cathode gas supply pipe 13 to selectively block the inflow of cathode gas to the FC stack 11. A pressure regulating valve 18 is provided on the cathode off-gas pipe 14 to adjust the back pressure of the cathode gas.

The cathode gas supply system of the FC module 10 includes a rotation speed detection sensor S1 that detects the rotation speed of the air compressor 12 and a gas flow rate detection sensor S2 that detects the flow rate of cathode gas flowing through the cathode gas supply pipe 13. The control valve 16, shut-off valve 17, and pressure regulating valve 18 are, for example, electromagnetic valves.

The fuel circulation pump 24 supplies fuel gas (anode gas) sent from the fuel tank 50 to the anode electrode of the FC stack 11. The anode gas supply system including the fuel circulation pump 24 includes an anode gas supply pipe 21, an anode off-gas pipe 22, and a circulation path 23. The anode gas supply pipe 21 flows anode gas supplied from the fuel tank 50 to the anode electrode of the FC stack 11. In the example embodiments of this disclosure, the fuel tank 50 is a hydrogen tank that stores high-pressure hydrogen gas.

The anode off-gas pipe 22 flows anode off-gas discharged from the FC stack 11. The anode off-gas is led through the anode off-gas pipe 22 to a gas-liquid separator 25 in which moisture is removed. The anode off-gas with moisture removed returns to the anode gas supply pipe 21 through the circulation path 23 by the fuel circulation pump 24. The anode off-gas circulating through the circulation path 23 can be discharged through the anode off-gas pipe 22 by opening an exhaust valve 26. Moisture accumulated in the gas-liquid separator 25 can be discharged through the anode off-gas pipe 22 by opening the exhaust valve 26. The exhaust valve 26 is, for example, an electromagnetic valve. In the example shown in the figure, the anode off-gas pipe 22 is connected to the cathode off-gas pipe 14. By adopting this configuration, it is possible to improve the utilization efficiency of the anode gas by circulating the anode off-gas containing unreacted anode gas that did not contribute to the electrochemical reaction and supplying it again to the FC stack 11.

To enhance the performance of the FC stack 11, temperature control is important. When generating electricity through the reaction of producing water from hydrogen gas and oxygen gas, heat is also generated, necessitating cooling. FIG. 2 shows a coolant circulation system including a coolant pump 31 for the FC stack 11, but as described later, cooling circulation systems for other electrical equipment may also be provided. Note that the air compressor 12, fuel circulation pump 24, and coolant pump 31 included in the FC module 10 are driven by individual built-in motors. These motors are also electrical equipment.

The coolant circulation system including the coolant pump 31 shown in FIG. 2 includes a coolant supply pipe 32, a coolant discharge pipe 33, a radiator device 34, and a temperature sensor S3. This coolant circulation system is configured to adjust the temperature of the FC stack 11 within a predetermined range by circulating coolant through the FC stack 11. The coolant is supplied to the FC stack 11 through the coolant supply pipe 32. The supplied coolant flows through a coolant path between single cells and is discharged into the coolant discharge pipe 33. The coolant discharged into the coolant discharge pipe 33 flows to the radiator device 34. The radiator device 34 performs heat exchange between the incoming coolant and the outside air to release heat from the coolant, and then resupplies the cooled coolant to the coolant supply pipe 32.

The coolant pump 31 is provided on either the coolant supply pipe 32 or the coolant discharge pipe 33 to pump coolant to the FC stack 11. A coolant bypass flow path may be provided between the coolant discharge pipe 33 and the coolant supply pipe 32. In that case, a flow dividing valve is provided at the branching point at which the coolant bypass flow path branches from the coolant discharge pipe 33. The flow dividing valve is configured to adjust the flow rate of coolant flowing through the bypass flow path. The temperature sensor S3 detects the temperature of the coolant flowing through the coolant discharge pipe 33.

The coolant used to cool the FC stack 11 is circulated through the flow path by an electric coolant pump 31. A coolant control valve may be provided downstream of the FC stack 11. The coolant control valve adjusts the ratio of coolant flowing to the radiator device 34 and coolant bypassing the radiator device 34, enabling more accurate control of the coolant temperature. Furthermore, by controlling the liquid delivery amount by the coolant pump, it is also possible to control the coolant temperature difference between the inlet and outlet of the FC stack 11 to be within a desired range. The temperature of the coolant in the FC stack 11 may be controlled to be around 70° C., for example, which is a temperature where the power generation efficiency of the FC stack 11 is high.

The coolant flowing through the FC stack 11 preferably has higher insulation properties compared to the coolant used to cool ordinary electrical equipment. Since voltages exceeding 300 volts can occur in the FC stack 11, increasing the electrical resistance of the coolant allows for the suppression of current leakage through the coolant or devices such as the radiator device 34. The electrical resistance of the coolant may decrease as the coolant is used. This is because ions dissolve into the coolant flowing through the FC stack 11. To remove such ions from the coolant and increase insulation property, it is desirable to place an ion exchanger in the coolant flow path.

The boost circuit 40 is configured to increase the voltage output by the FC stack 11 through power generation to a desired level. The subsequent stage of the boost circuit 40 is connected to the high-voltage electrical circuit including an inverter device for motor drive. As described later, the subsequent stage of the boost circuit 40 may also be connected in parallel to the low-voltage electrical circuit via a step-down circuit.

The controller 42 may include an electronic control unit (ECU) configured or programmed to control power generation by the FC module 10. The controller 42 detects or estimates the operating state of the FC power generation system 180 based on signals output from various sensors. The controller 42 is configured or programmed to control power generation by the FC stack 11 by regulating the operation of the air compressor 12, fuel circulation pump 24, coolant pump 31, and various valves, based on the operating state of the FC power generation system 180 and instructions output from a higher-level computer or other ECUs. The controller 42 includes, for example, a processor, a storage device, and an input/output interface.

In the following description, for simplicity, "anode gas" may be referred to as "fuel gas" or "fuel," and "anode gas supply pipe" may be referred to as "piping."

Figure 3:
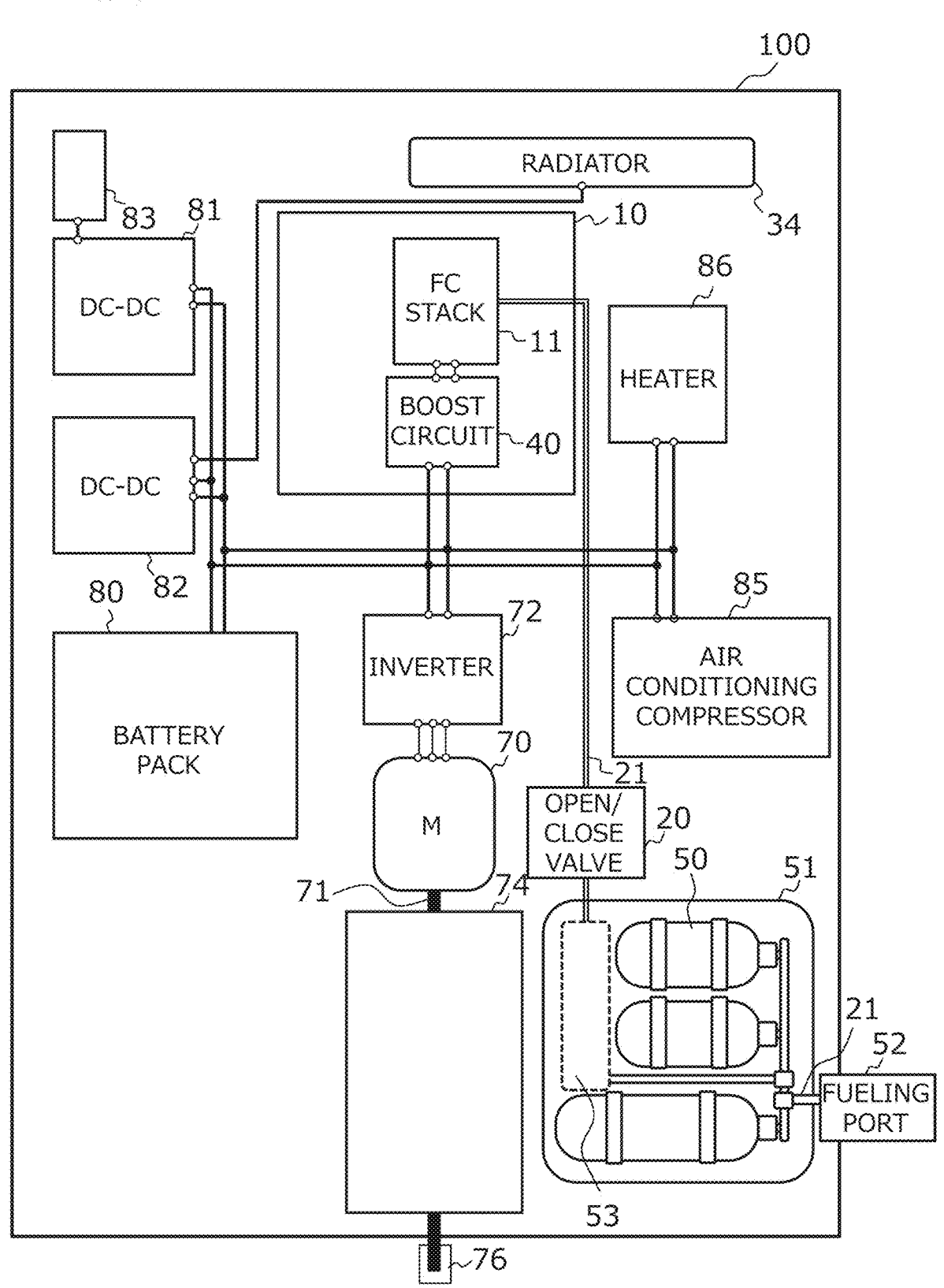
FIG. 3 shows a block diagram schematically showing an example of electrical connections and power transmission between components of a work vehicle according to an example embodiment of the present disclosure.
Figure 4:
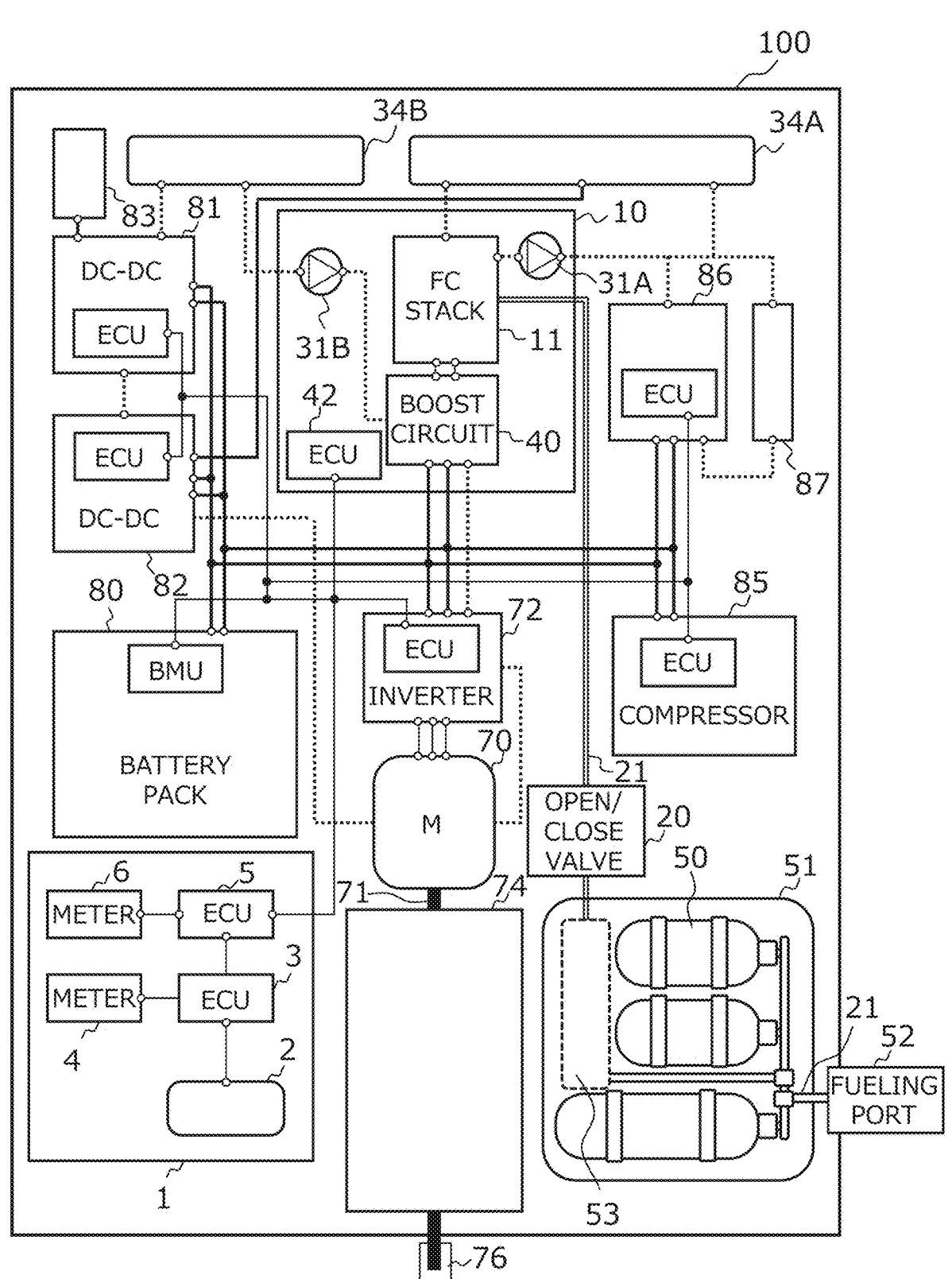
FIG. 4 shows a block diagram schematically showing paths of electrical signals (solid thin lines) and coolant paths (dotted lines) between components of a work vehicle according to an example embodiment of the present disclosure.

Next, referring to FIGS. 3 and 4, a configuration example of the system of the work vehicle 100 according to this disclosure will be described. FIG. 3 is a block diagram schematically showing an example of electrical connections and power transmission between components of the work vehicle 100 according to this disclosure. FIG. 4 is a block diagram showing a more detailed configuration than the example in FIG. 3. FIG. 4 schematically shows the paths of electrical signals (thin solid lines) and coolant (dotted lines) between components in the work vehicle 100.

First, referring to FIG. 3, an example of the electrical connections and power transmission between components will be described. Electrical connections include both high-voltage and low-voltage systems. High-voltage electrical connections provide, for example, the power supply voltage for inverter devices. Low-voltage electrical connections provide, for example, the power supply voltage for electronic components that operate at relatively low voltages.

In the example shown in FIG. 3, the work vehicle 100 includes an FC module 10, an inverter device 72, a motor 70, a power transmission system 74, and a PTO shaft 76. The DC voltage of the power generated in the FC stack 11 of the FC module 10 is boosted by the boost circuit 40 and then supplied to the inverter device 72. The inverter device 72 converts the DC voltage into, for example, a three-phase AC voltage and supplies it to the motor 70. The inverter device 72 includes a bridge circuit including a plurality of power transistors. The motor 70 includes a rotating rotor and a stator with a plurality of coils electrically connected to the inverter device 72. The rotor is coupled to the output shaft 71, for example, via a reduction gear (speed reducer) or directly. The motor 70 rotates the output shaft 71 with torque and rotational speed controlled according to the waveform of the three-phase AC voltage from the inverter device 72.

The torque of the output shaft 71 of the motor 70 is transmitted to the power transmission system 74. The power transmission system 74 operates with the motor 70 as the power source to drive the wheels 104R and 104F, as shown in FIG. 1, and/or the PTO shaft 76. This power transmission system 74 may have the same or a similar structure as the power transmission system in conventional tractors including internal combustion engines such as diesel engines. By adopting a power transmission system used in agricultural tractors, for example, it is possible to reduce the design and manufacturing costs for producing an agricultural work vehicle 100 including an FC power generation system. The power transmission system 74 includes a travel power transmission mechanism that transmits power from the motor 70 to the left and right rear wheels 104R through a clutch, transmission, and rear wheel differential device, as well as a PTO power transmission mechanism that transmits power from the motor 70 to the PTO shaft 76. The transmission case 102B in FIG. 1 may be divided into a front case (mission case) housing the clutch and transmission and related components, and a rear case (differential gear case) housing the rear wheel differential device and related components. The rear case may also be referred to as a rear axle case.

The work vehicle 100 includes a secondary battery (battery pack) 80 that temporarily stores electrical energy generated by the FC module 10. An example of the battery pack 80 includes a pack of lithium-ion batteries. The battery pack 80 is configured to supply power to the inverter device 72 at the necessary timing in cooperation with the FC module 10 or independently. Various battery packs used in electric passenger vehicles may be adopted as the battery pack 80.

The work vehicle 100 includes various electrical equipment (onboard electronic components) that operates on electricity, in addition to the motor 70 and the inverter device 72. Examples of electrical equipment electromagnetic valves such as open/close valves 20, air cooling fans of the radiator device 34, electric pumps of air conditioning compressors 85, and temperature control devices to heat or cool the FC stack 11. These temperature control devices include electric heaters 86. DC-DC converters 81 and 82 to obtain appropriate power supply voltages for the operation of electrical equipment, and storage batteries 83 may also be included in the electrical equipment. Furthermore, various electronic components not shown (such as lamps, electric motors for hydraulic systems) may be included in the electrical equipment. The electrical equipment may be electronic components similar to electrical equipment installed in conventional agricultural tractors.

In the example of FIG. 3, the first DC-DC converter 81 is a circuit that steps down the voltage output from the boost circuit 40 of the FC module 10 to a first voltage, for example, 12 volts. The storage battery 83 is, for example, a lead-acid battery and stores electrical energy at the voltage output from the first DC-DC converter 81. The storage battery 83 may be used as a power source for various electrical equipment such as lamps.

The work vehicle 100 shown in FIG. 3 includes not only the first DC-DC converter 81 but also a second DC-DC converter 82 as a voltage conversion circuit that steps down the high voltage output by the FC module 10. The second DC-DC converter 82 is a circuit that steps down the voltage output from the boost circuit 40 of the FC module 10 (for example, several hundred volts) to a second voltage higher than the first voltage, for example, 24 volts. The air cooling fan of the radiator device 34, for example, is configured to operate on the voltage output from the second DC-DC converter 82. Note that although the radiator device 34 is described as a single component in FIG. 3, one work vehicle 100 may include a plurality of radiator devices 34. Additionally, the electric pump of the air conditioning compressor 85 and the electric heater 86 are configured to operate on the voltage output from the second DC-DC converter 82.

The work vehicle 100 shown in FIG. 3 includes a temperature control device that cools or heats the FC stack 11 included in the FC power generation system. The operation of the temperature control device or alike requires relatively large power. The relatively high 24-volt voltage output by the second DC-DC converter 82 is applied to the temperature control device. In this example embodiment, the temperature control device includes the radiator device 34 that releases heat from the coolant cooling the FC stack 11, and the relatively high 24-volt voltage (second voltage) output by the second DC-DC converter 82 is applied to the radiator device 34. The temperature control device includes a heater 86 that heats the FC stack 11. The relatively high voltage output by the second DC-DC converter 82 may also be applied to the heater. The relatively high voltage output by the second DC-DC converter 82 may also be applied to air conditioning devices such as the air conditioning compressor 85.

The work vehicle 100 may include a third voltage conversion circuit that converts the high voltage output by the FC module 10 to a third voltage higher than the second voltage. The third voltage is, for example, 48 volts. If the work vehicle 100 includes another motor in addition to the motor 70, for example, the third voltage may be used as the power source for such other motors.

In an agricultural work vehicle including a fuel cell power generation system, in addition to the electrical equipment necessary for agricultural task, the agricultural work vehicle also includes electrical equipment necessary for the operation of fuel cell power generation, so the appropriate voltage magnitude may differ for each electrical equipment. According to the example embodiments of this disclosure, it is possible to supply voltages of appropriate magnitudes.

In the example shown in FIG. 3, a plurality of fuel tanks 50 are housed in a single tank case 51. The fuel tank 50 is connected to a supplying port (fueling port) 52 through which fuel is supplied from the outside. This connection is made via piping 21 for flowing fuel gas. The fuel tank 50 is also connected to the FC module 10 via piping 21, which is equipped with an open/close valve 20. When hydrogen is used as the fuel gas, the piping 21 may be formed d from materials with high resistance to hydrogen embrittlement, such as austenitic stainless steel like SUS316L.

As described later, a valve space 53 is provided in the tank case 51, and various valves including a pressure reducing valve are placed in this valve space 53. Through various valves provided in the valve space 53, the piping 21 connects the fuel tank 50 and the FC module 10. Fuel gas with reduced pressure by the pressure reducing valve flows through the piping 21 connecting the tank case 51 and the FC module 10. When the fuel gas is hydrogen gas, high-pressure hydrogen gas of, for example, 35 megapascals or more may be supplied in the fuel tank 50, but the hydrogen gas after passing through the pressure reducing valve may be reduced to about 2 atmospheres or less.

Next, refer to FIG. 4. In addition to what is shown in FIG. 3, FIG. 4 shows a plurality of ECUs that communicate within the work vehicle 100 and a user interface 1. Communication can be executed via CAN bus wiring and other similar communication pathways, which function as paths for electrical signals (thin solid lines). FIG. 4 also shows a cooling system to perform thermal management of components. Specifically, the path of coolant (dotted line) is schematically shown.

As mentioned above, the first and second DC-DC converters 81 and 82 are configured to output voltages of different magnitudes. ECUs are also provided for these first and second DC-DC converters 81 and 82 to control each voltage conversion circuit. These ECUs, like other ECUs, are applied the relatively low first voltage output by the first DC-DC converter 81.

In the example of FIG. 4, the work vehicle 100 includes a cooling system in which coolant circulates via coolant pumps 31A and 31B. These coolant pumps 31A and 31B are provided inside the FC module 10. The cooling system in this example includes a first radiator device 34A responsible for cooling the FC stack 11 and a second radiator device 34B to cool other electrical equipment. The cooling system includes a flow path (first flow path) where coolant flows between the FC stack 11 and the first radiator device 34A. Furthermore, this cooling system includes a flow path (second flow path) where coolant flows between electrical equipment including the motor 70 and the second radiator device 34B. In the example of FIG. 4, for instance, a heater core 87 used to heat the cabin is provided, and the coolant flowing through the first radiator device 34A flows through the heater core 87.

The user interface 1 includes an operation device 2 such as an accelerator pedal (or accelerator lever) and a main ECU 3 connected to the operation device 2. The main ECU 3 is connected to a main meter 4. The main meter 4 may display various parameters that identify the travel state or operating state of the work vehicle 100. The user interface 1 further includes an FC system ECU 5 configured or programmed to control the FC power generation system. The FC system ECU 5 is connected to an FC meter 6. The FC meter 6 may display various parameters that identify the operating state of the FC power generation system.

The cells of the battery pack 80 are controlled by a Battery Management Unit (BMU). The BMU includes circuits and a CPU (Central Processing Unit) that perform voltage monitoring for each cell of the battery, monitoring of overcharging and over-discharging, and cell balance control. These circuits and CPU may be mounted on a battery controller board.

Figure 5:
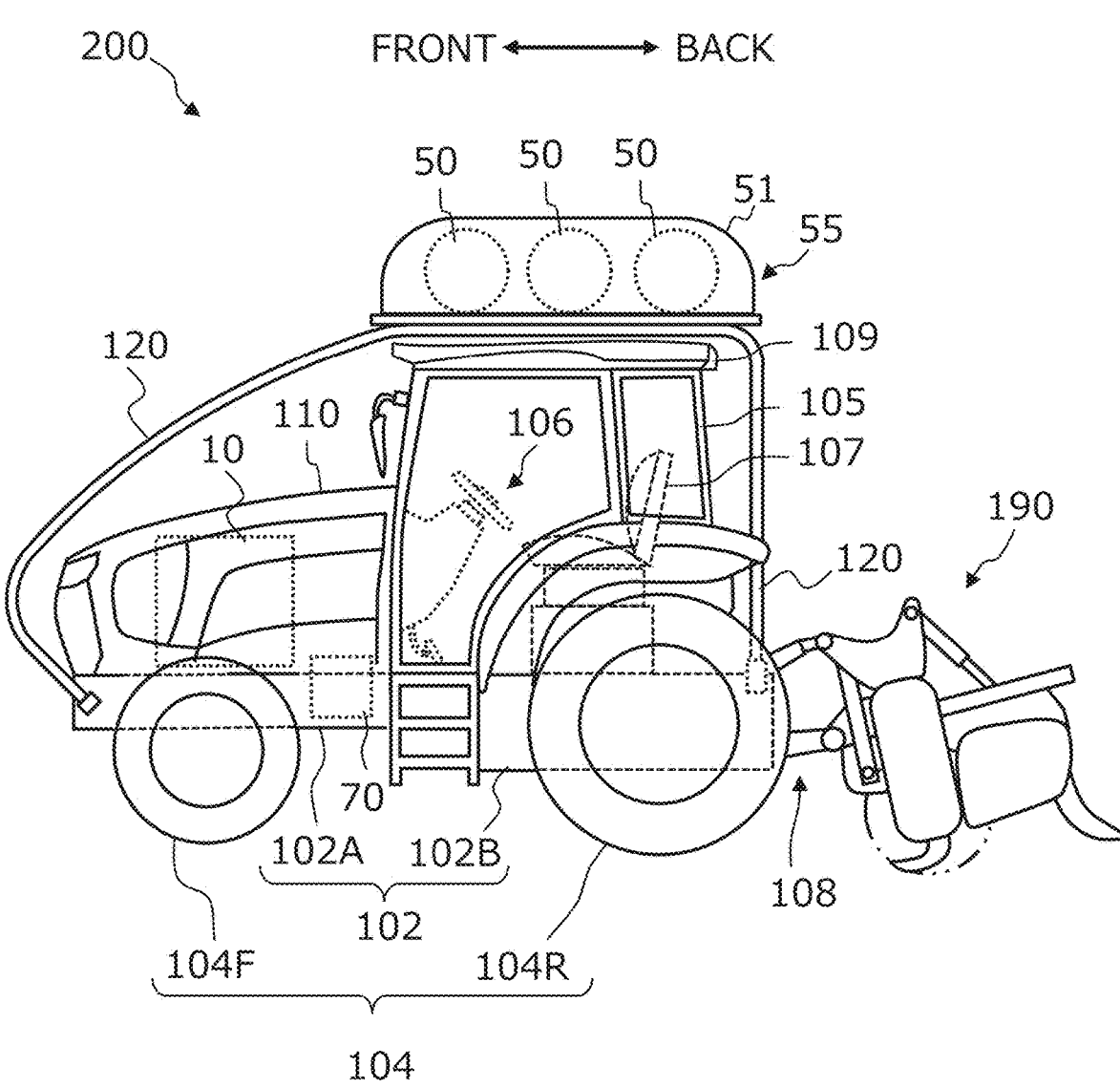
FIG. 5 shows a side view schematically showing a configuration example of a work vehicle according to an example embodiment of the present disclosure.
Figure 6A:
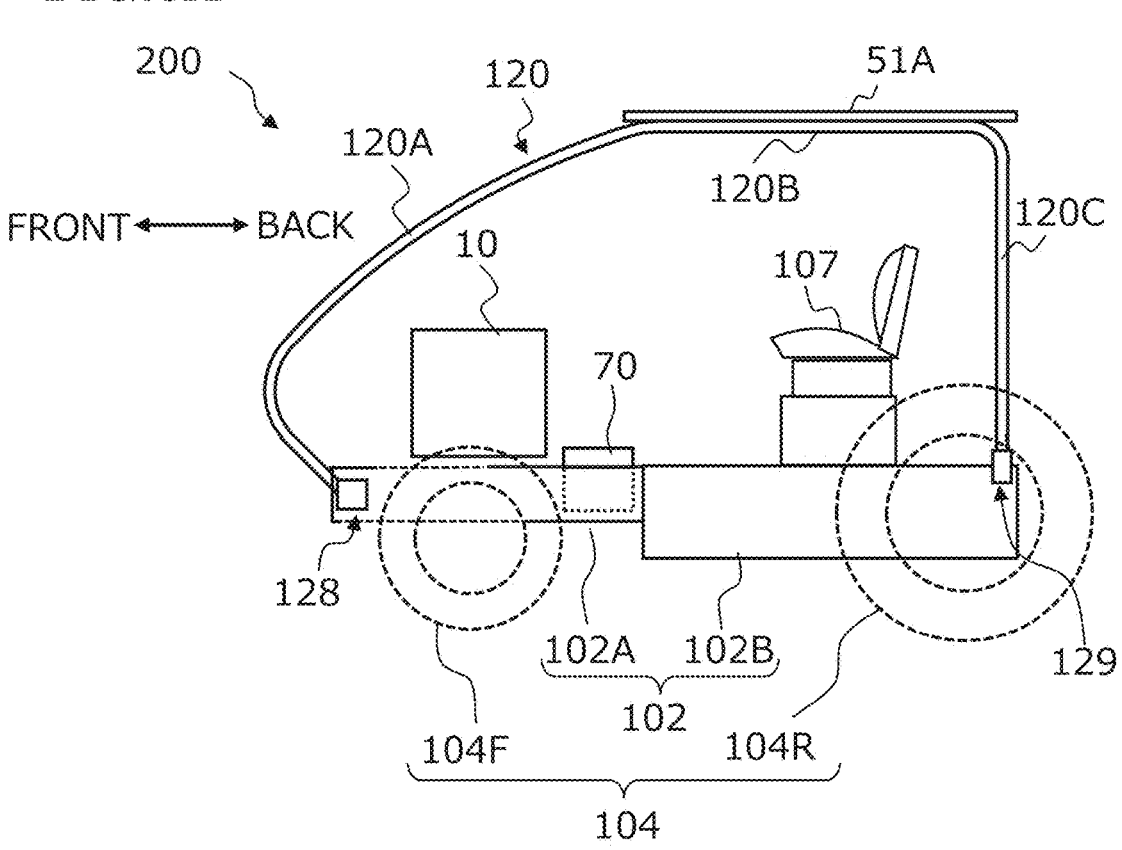
FIG. 6A shows a side view schematically showing an example of an arrangement relationship of major portions in a work vehicle according to an example embodiment of the present disclosure.
Figure 6B:
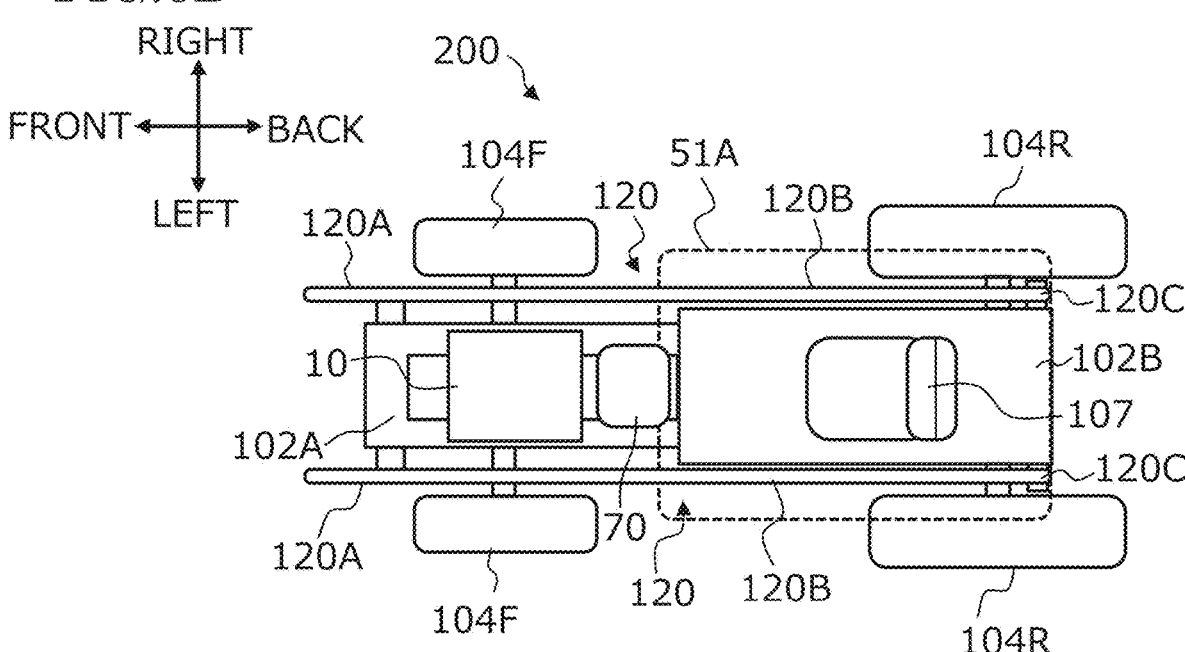
FIG. 6B shows a plan view schematically showing an example of an arrangement relationship of major portions in a work vehicle according to an example embodiment of the present disclosure.
Figure 7:
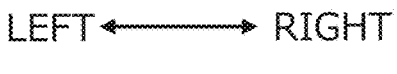
FIG. 7 shows a diagram schematically showing a mechanism supporting a fuel tank in an example embodiment of the present disclosure.

Next, referring to FIGS. 5 to 7, the basic configuration of the work vehicle according to the example embodiments of this disclosure will be explained. FIG. 5 is a side view schematically showing a configuration example of the work vehicle 200 in this example embodiment. FIG. 6A is a side view schematically showing an example of the placement relationship of the main portions in the work vehicle 200, and FIG. 6B is its plan view. FIG. 7 is a diagram schematically showing a mechanism to support the fuel tank 50.

The work vehicle 200 in this example embodiment includes an FC module 10, a fuel tank 50, a motor 70, a driver seat 107, and a vehicle frame 102. The work vehicle 200 has a configuration similar to the configuration of the work vehicle 100 explained with reference to FIG. 1.

In this example embodiment, the fuel tank 50 is supported by a mounting frame 120. The mounting frame 120 is fixed to the vehicle frame 102 across the driver seat 107. In the work vehicle 200 of this example embodiment, due to the configuration and function of the mounting frame 120, the fuel tank 50 can be stably supported above the driver seat 107. As a result, the freedom of component placement of the FC module 10, motor 70, and other components supported by the vehicle frame 102 is increased. Additionally, the need to significantly alter the structure of conventional engine-driven tractors is decreased. These factors contribute to reducing design and manufacturing costs.

A configuration example of the mounting frame 120 will be explained below.

In this example embodiment, the mounting frame 120 is an elongated structure, such as a pipe, fixed to the vehicle frame 102. As shown in FIG. 6A, the mounting frame 120 includes a front portion 120A, a middle portion 120B, and a rear portion 120C. The front portion 120A has a curved shape and connects to the middle portion 120B. The middle portion 120B has a shape that extends linearly in the front-back direction and connects to the rear portion 120C. The rear portion 120C has a shape that extends linearly in the vertical direction. Note that the shape of the mounting frame 120 shown is just an example, and the shape of the mounting frame 120 is not limited to this example.

In this example embodiment, the vehicle frame 102 includes a front frame 102A that rotatably supports the front wheels 104F and a transmission case 102B that rotatably supports the rear wheels 104R. As shown in FIG. 6A, one end (front end) 128 of the mounting frame 120 is fixed to the front frame 102A. The other end (rear end) 129 of the mounting frame 120 is fixed to the transmission case 102B. These fixations may be done by appropriate methods such as welding or bolt joining, depending on the material of the mounting frame 120. The mounting frame 120 may be formed from metal, synthetic resin, carbon fiber, or composite materials such as carbon fiber reinforced plastic or glass fiber reinforced plastic. The transmission case 102B includes a rear axle case, and the rear end 129 of the mounting frame 120 may be fixed to the rear axle case. When the mounting frame 120 is formed from metal, a portion or an entirety of its surface may be covered with synthetic resin.

The mounting frame 120 is required to have sufficient rigidity to support the fuel tank 50. When the work vehicle 200 travels on uneven ground, the fuel tank 50 supported by the mounting frame 120 may vibrate up and down or front, back, left, and right. Due to the elastic deformation of the mounting frame 120, a portion or an entirety of the mounting frame 120 bends moderately, thereby mitigating the impact on the fuel tank 50. To obtain this effect of mitigating impacts, it is effective for the front portion 120A of the mounting frame 120 to have a curved shape and allow deformation within a predetermined range. A portion or an entirety of the rear portion 120C of the mounting frame 120 may also have a curved or inclined shape.

The outer shape of the cross-section perpendicular to the elongated direction of the mounting frame 120 is, for example, circular or elliptical, but is not limited to these. The cross-sectional shape may be rectangular or other polygonal shapes. When the mounting frame 120 has an approximately cylindrical or columnar shape, its outer diameter is, for example, in the range of 10 mm or more and 100 mm or less. The inner diameter may be 0% or more and 90% or less of the outer diameter, for example.

As shown in FIG. 5, the work vehicle 200 includes a cabin 105 that surrounds the driver seat 107 between the vehicle frame 102 and the mounting frame 120. The driver seat 107 is located in the rear portion of the interior of the cabin 105 (referred to as the "cabin interior"). In front of the driver seat 107, for example, a steering wheel 106 is provided to change the direction of the front wheels 104F. The cabin 105 includes a cabin frame that define its skeleton. A roof 109 is provided on the upper portion of the cabin frame. The cabin frame in this example embodiment is a 4-pillar style. The cabin 105 is supported by the transmission case 102B of the vehicle frame 102, for example, via vibration-isolating mounts. The interface 1 explained with reference to FIG. 4 is provided inside the cabin 105. Since the cabin 105 does not directly support the fuel tank 50, there is no need to specially increase its strength, and a cabin that has been used in conventional tractors can be adopted.

The middle portion 120B of the mounting frame 120 extends in the front-back direction along the roof 109 of the cabin 105 and functions as a support portion (support) for the fuel tank 50. The fuel tank 50 is supported by the middle portion 120B of the mounting frame 120 above the roof 109 of the cabin 105.

Next, refer to FIG. 6B. In this example embodiment, the mounting frame 120 includes not one but two frames positioned on the left and right sides of the work vehicle 200. In the plan view of FIG. 6B, the left and right mounting frames 120 extend parallel or substantially parallel to the front-back direction of the work vehicle 200. The two mounting frames 120 are positioned to avoid the center area of the field of view of an operator seated in the driver seat 107 looking in the forward direction. The number of mounting frames 120 may be one, or it may be three or more. It is desirable that the mounting frame 120 is placed to avoid the center area of the field of view of an operator seated in the driver seat 107 looking in the forward direction, and to support the fuel tank 50 in a balanced manner. From this perspective, it is desirable that the number of mounting frames 120 is even, for example.

As shown in FIG. 6B, in a plan view looking down from directly above, individual mounting frames 120 do not need to extend directly above the driver seat. In this disclosure, the mounting frame 120 "being fixed to the vehicle frame across the driver seat" means that, as shown in FIG. 6A, in a side view, a portion of the mounting frame fixed to the vehicle frame extends above the driver seat 107, or above the cabin 105, along the front-back direction. In the example of FIG. 6B, the two mounting frames 120 are parallel to each other, but the spacing between the mounting frames 120 does not need to be constant along the front-back direction and may vary.

The work vehicle 200 includes a placement platform 51A that connects the left frame 120 and the right frame 120. The fuel tank 50 can be positioned on the placement platform 51A. When there are a plurality of fuel tanks 50, the plurality of fuel tanks 50 may be provided in a fuel tank module. The fuel tank module includes a tank case 51 that houses a plurality of fuel tanks 50 (FIG. 5). The left and right mounting frames 120 may be connected to each other by structural elements other than the placement platform 51A.

A coupling device 108 is provided at the rear end of the transmission case 102B, which defines the rear portion of the vehicle frame 102. The coupling device 108 includes, for example, a three-point support device (referred to as a "three-point link" or "three-point hitch"), a PTO shaft, a universal joint, and a communication cable. The implement 190 can be attached to or detached from the work vehicle 200 using the coupling device 108. The coupling device 108 can, for example, raise and lower the three-point link by a hydraulic device to change the position or posture of the implement 190. Additionally, power can be transmitted from the work vehicle 200 to the implement 190 via the universal joint. The work vehicle 200 can execute predetermined work (agricultural task) with the implement 190 while pulling the implement 190. The coupling device 108 may be provided on the front portion of the vehicle frame 102, in which case the implement 190 can be connected to the front of the work vehicle 200.

Next, referring to FIG. 7, an example of the configuration to support the fuel tank 50 by the mounting frame 120 will be explained.

In the example of FIG. 7, the placement platform 51A of the fuel tank 50 is fixed to the middle portion 120B of the mounting frame 120. This fixation can be realized, for example, by a connector 127 such as a pipe mounting fitting. The fuel tank 50 is fixed to the placement platform 51A, for example, by a fixing belt 56. A cover 51B is detachably or openably/closably attached to the placement platform 51A to cover the fuel tank 50. In this example, the tank case 51 includes the placement platform 51A and the cover 51B. The tank case 51 functions as part of at least one enclosure that houses the FC module 10 and the fuel tank 50.

The cover 51B in this example embodiment includes a curved portion 51C that connects from the top surface portion 51T to the surrounding side surface portion 51S. The height of the cover 51B is highest at the top surface portion 51T, and the height of the curved portion 51C decreases as it approaches the side surface portion 51S. By adopting the cover 51B with the shape above, the effects are obtained: reducing or preventing rain accumulation on the cover 51B of the tank case 51, and facilitating removal of snow accumulated on the tank case 51. An opening may be provided in the tank case 51 to exhaust fuel gas that has leaked inside to the outside. It is preferable that a structural element such as a lid that covers the opening is provided for the opening to prevent rain and dust from entering the inside of the tank case 51. The tank case 51 may be formed from metal, synthetic resin, carbon fiber, or composite materials such as carbon fiber reinforced plastic or glass fiber reinforced plastic.

Inside the tank case 51, the fuel tank 50 is connected to piping 21 to flow fuel gas via valves 57 such as a pressure reducing valve and an electromagnetic valve. The piping 21 inside the tank case 51 is connected to piping 21 outside the tank case 51 through the opening provided, for example, in the placement platform 51A. In the example of FIG. 7, a portion of the piping 21 outside the tank case 51 is disposed inside the middle portion 120B of the mounting frame 120.

In other words, a portion of the piping 21 connecting the fuel tank 50 and the FC module 10 is located inside the mounting frame 120. The piping 21 connecting the tank case 51 and the FC module 10 is configured to pass fuel that has been reduced in pressure by the pressure reducing valve. Wiring cables are connected to valves 57 such as electromagnetic valves. A portion or an entirety of such wiring cables may be routed through the inside of the mounting frame 120.

The piping 21 or wiring cables may be arranged along the outer surface of the mounting frame 120 rather than inside the mounting frame 120. However, it is preferable that they are arranged inside the mounting frame 120, as the mounting frame 120 which has rigidity functions to protect the piping 21 and wiring cables.

The mounting frame 120 does not need to be fixed to the roof 109 of the cabin 105. As shown in FIG. 7, there may be a gap between the roof 109 of the cabin 105 and the middle portion 120B of the mounting frame 120. When the work vehicle 200 is traveling on uneven ground, the vertical vibrations of the cabin 105 and the vertical vibrations of the tank case 51 supported by the mounting frame 120 do not need to match in amplitude and frequency. In the example of FIG. 7, a damper 54 is provided between the roof 109 and the placement platform 51A. With the damper 54, even if the work vehicle 200 undergoes significant vertical movement, collision between the placement platform 51A and the roof 109 is suppressed.

In this example embodiment, the rear portion 120C of the mounting frame 120, which extends in the vertical direction, supports the placement platform 51A (FIGS. 5, 6A). When the rear portion 120C of the mounting frame 120 is made of a material such as metal that is not easily extensible along its length, the rear portion 120C functions to suppress the vertical movement of the placement platform 51A relative to the vehicle frame 102. On the other hand, when the cabin 105 is supported by the vehicle frame 102 via vibration-isolating mounts 105B, the vibration of the cabin 105 relative to the vehicle frame 102 may show different behavior from the vibration of the placement platform 51A relative to the vehicle frame 102. When providing a damper 54 between the roof 109 and the placement platform 51A, it is possible to control the coupled vibration of the cabin 105 and the fuel tank 50 by adjusting the damping ratio of the damper 54. The type, number, and position of the damper 54 can be determined considering the size and weight of the tank case 51 and other relevant factors. In place of or in combination with the damper 54, the cabin 105 and the placement platform 51A may be coupled by elastic members such as springs or rubber. The damper 54 and/or elastic members may be arranged to couple the middle portion 120B of the mounting frame 120, rather than the placement platform 51A, to the cabin 105.

Unlike this example embodiment, when the fuel tank 50 is firmly fixed to the cabin 105, for example, by welding or connecting fittings such as flange bolts, the cabin 105 and the fuel tank 50 move or vibrate integrally during travel. In contrast, in this example embodiment, some degree of freedom of movement is allowed between the cabin 105 and the fuel tank 50, the vibration mode of the cabin 105 from the vibration mode of the fuel tank 50 can be separated. This brings about a soundproofing effect in the cabin interior, for example.

As mentioned above, when a portion of the piping 21 is provided inside the mounting frame 120, a fueling port connected to the piping 21 may be provided on the mounting frame 120. (Details of the fueling port 52 (FIGS. 3, 4) will be described later.)

Figure 8:
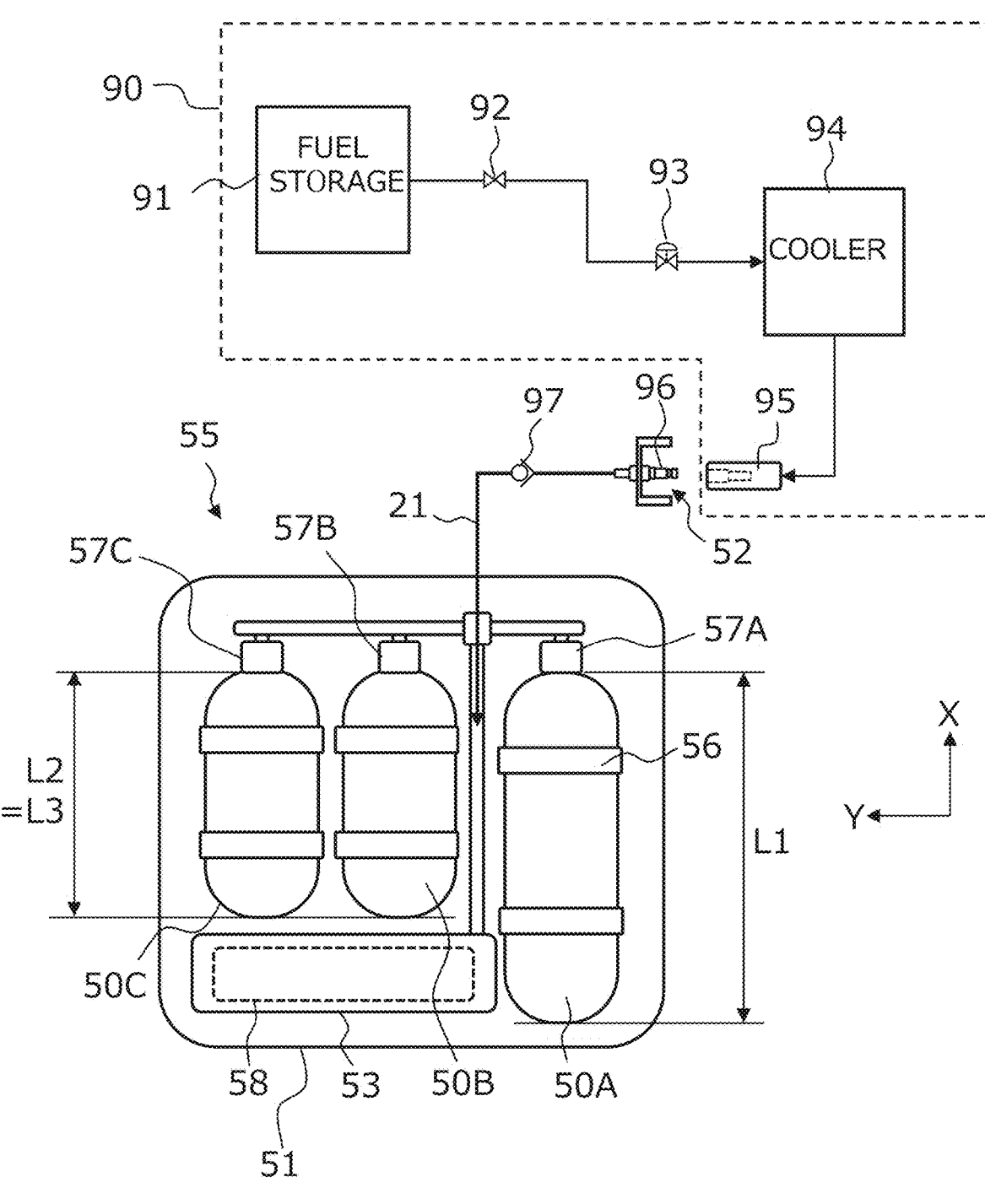
FIG. 8 shows a diagram schematically showing a configuration example of a fuel tank module in an example embodiment of the present disclosure.

Next, referring to FIG. 8, a configuration example of the fuel tank module will be explained. In FIG. 8, X-axis and Y-axis perpendicular to each other are shown for reference.

The fuel tank module 55 in the example of FIG. 8 includes a plurality of fuel tanks 50, a valve system 58 connected to the plurality of fuel tanks 50, and a tank case 51 that houses the plurality of fuel tanks 50 and the valve system 58.

The valve system 58 includes open/close valves and pressure reducing valves located inside the tank case 51. Additionally, the valve system 58 housed in the tank case 51 may further include check valves, filters, safety valves, pressure sensors, and vent pipes. These devices included in the valve system 58 are connected by high-pressure or low-pressure piping.

The tank case 51 includes a bottom plate that extends along a plane (XY plane) defined by the X-axis direction (first direction) and the Y-axis direction (second direction), and the plurality of fuel tanks 50 are placed on this bottom plate. In this example embodiment, a placement platform 51A defines and functions as the bottom plate. The shape of the placement platform 51A need not be a flat plate and may include ridges or grooves to increase strength. The placement platform 51A may also include protrusions and recesses to secure the fuel tanks 50, cover 51B, and other parts such as valves, and/or openings.

In this example embodiment, each of the plurality of fuel tanks 50 is a high-pressure hydrogen tank having a cylindrical portion extending in the X-axis direction. The outer diameter of the cylindrical portion may be about 300 mm, for example. An example of the fuel tank 50 is a resin high-pressure hydrogen tank, which may include a multi-layer structure including, for example, a resin liner, carbon fiber reinforced plastic, and glass fiber reinforced plastic.

In this example, the plurality of fuel tanks 50 include a first fuel tank 50A having a first length L1 in the X-axis direction, a second fuel tank 50B having a second length L2 shorter than the first length L1 in the X-axis direction, and a third fuel tank 50C having a third length L3 shorter than the first length L1 in the X-axis direction. In other example embodiments of this disclosure, the third fuel tank 50C need not be included, and additional fuel tanks may be included. The number of fuel tanks 50 in one fuel tank module 55 is not limited to three and may be any plurality. In the example of FIG. 8, the third length L3 is equal to the second length L2, but the third length L3 may differ from the second length L2.

The first fuel tank 50A, the second fuel tank 50B, and the third fuel tank 50C are arranged (aligned) in the Y-axis direction perpendicular to the X-axis direction. At least a portion of the valve system 58 is positioned in a space between the second fuel tank 50B and the tank case 51 inside the tank case 51. At least another portion of the valve system 58 is positioned in a space formed between the third fuel tank 50C and the tank case 51 inside the tank case 51. In other words, the valve system 58 is positioned in a valve space 53 within the space from the second fuel tank 50B and the third fuel tank 50C to the tank case 51. The sizes of L1-L2 and L1-L3 are determined based on the size of the space required for the valve space 53. In this example embodiment, for example, when L1 is about 700 mm, L1-L2=L1-L3 is set to 100 mm or more and 200 mm or less.

By housing the fuel tanks 50 of different lengths in the tank case 51 in this manner, it is possible to provide a space suitable for component storage within the tank case 51, and this space can be utilized as a valve space 53. By positioning several valves including open/close valves and pressure reducing valves, in the valve space 53, the functionality of the fuel tank module 55 can be enhanced. Specifically, due to the function of the pressure reducing valve inside the tank case 51, the fuel pressure can be reduced from, for example, 35 megapascals to several atmospheres before being extracted outside the tank case 51. As a result, expensive piping for high-pressure hydrogen gas is not necessary for the piping 21 connecting the tank case 51 and the FC module 10.

Next, referring to FIG. 8, an example configuration to supply fuel into the fuel tanks 50 of such a fuel tank module 55 will be explained.

In the example shown in FIG. 8, the fueling device 90 includes a fuel storage 91, a shut-off valve 92, a regulator 93, a cooler 94, and a dispenser nozzle 95. The fueling device 90 may be installed at a fixed site or may function as a mobile station mounted on a vehicle such as a truck. The dispenser nozzle 95 of the fueling device 90 is connected to the cooler 94 via a flexible fuel hose. The worker performing the refueling inserts the dispenser nozzle 95 into the fueling port 52 of the work vehicle 200, and then the process of filling the fuel (high-pressure hydrogen gas) begins.

The fueling port 52 equipped on the work vehicle 200 includes a receptacle 96 that receives fuel supply from the dispenser nozzle 95 of the fueling device 90. The receptacle 96 is inserted into an opening hole provided at the tip of the dispenser nozzle 95 when the dispenser nozzle 95 is inserted into the fueling port 52. The fuel injected from the dispenser nozzle 95 into the receptacle 96 is supplied to the fuel tanks 50A, 50B, and 50C placed inside the tank case 51 of the fuel tank module 55 through piping 21 with a check valve 97 installed midway. The fuel tanks 50A, 50B, and 50C are connected to the piping 21 via electromagnetic valves 57A, 57B, and 57C, respectively.

By selectively opening the electromagnetic valves 57A, 57B, and 57C, fuel from the fueling device 90 is supplied into any of the corresponding fuel tanks 50A, 50B, and 50C.

Figure 9A:
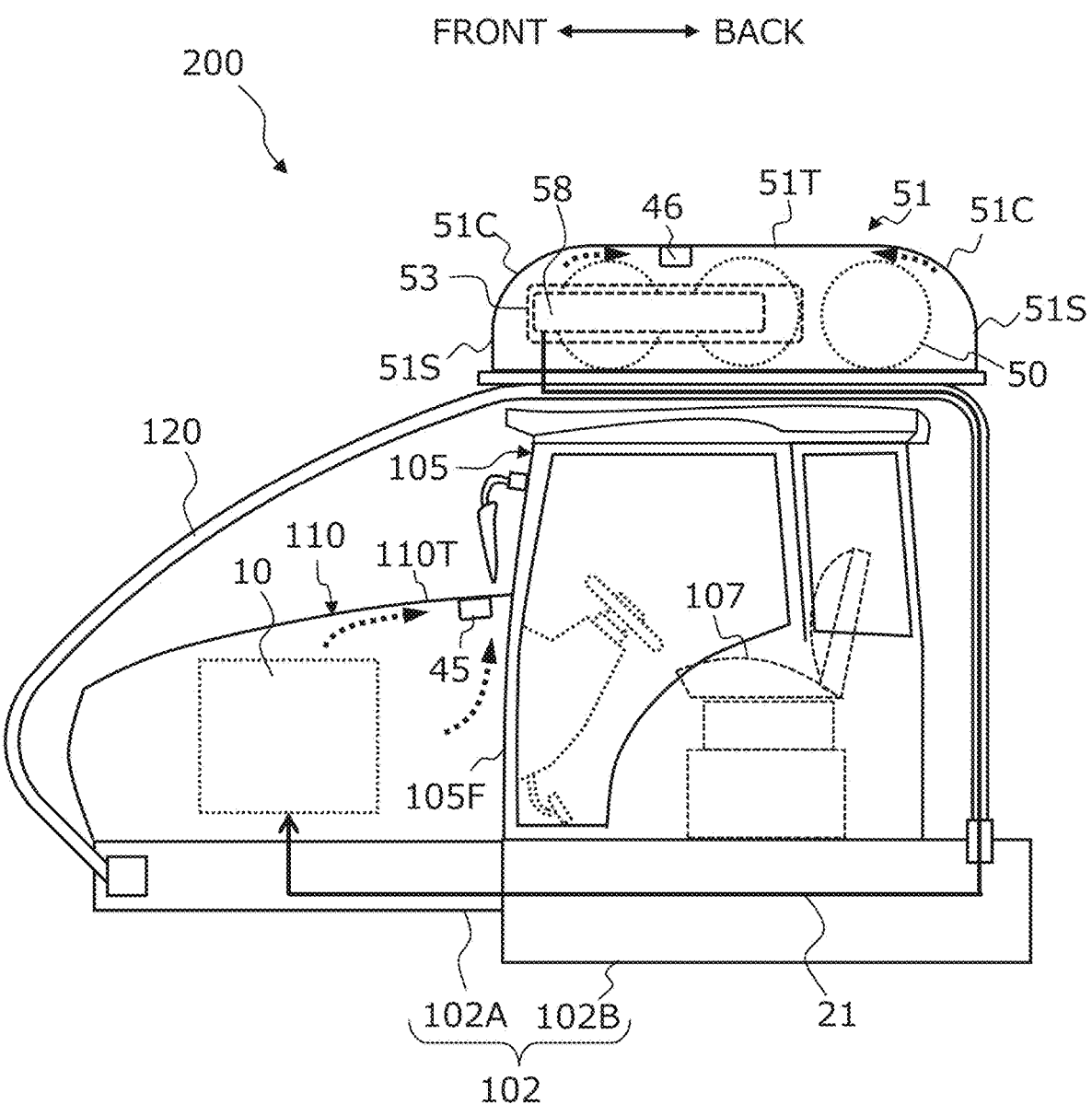
FIG. 9A shows a diagram schematically showing an arrangement of a fuel gas sensor within a front housing and a tank case in an example embodiment of the present disclosure.

In this example embodiment, the FC module 10 and the fuel tank 50 are housed in at least one "enclosure." FIG. 9A is a diagram schematically showing the flow of fuel (hydrogen) gas that leaks inside the front housing 110 and the tank case 51 functioning as the enclosures. In FIG. 9A, the flow of leaked fuel gas is schematically represented by dotted arrows. Such fuel gas leakage may occur from the FC module 10, fuel tank 50, valve system 58, and piping 21, and related components. In the example of FIG. 9A, the piping 21 connecting the fuel tank 50 and the FC module 10 is routed inside the mounting frame 120 and is inserted into the interior of the front housing 110.

The work vehicle 200 of this example embodiment includes at least one fuel gas sensor provided inside the enclosure. In this example embodiment, since the fuel gas is hydrogen gas, examples of the fuel gas sensor may include hydrogen gas sensors operating on various principles such as catalytic combustion type, gas thermal conductivity type, solid electrochemical type, and semiconductor type. If the fuel gas sensor detects a fuel gas leak, depending on the concentration level of the leaked fuel gas, actions such as notification/warning to the driver, fail-safe control or operation stop in the FC power generation system may be executed.

The enclosures in this example embodiment, namely the front housing 110 and the tank case 51, each has a shape and structure that controls the spread of leaked hydrogen gas into the atmosphere inside them, thereby facilitation to the detection of the hydrogen gas. Specifically, the upper surface 110U of the front housing 110 has a shape that gradually or stepwise increases in height from the front end of the work vehicle 200 towards the rear direction. Hydrogen gas that leaks inside the front housing 110, being lighter than air, flows along the upper surface 110U of the front housing 110 towards the rear direction, approaching the front surface 105F of the cabin 105. Additionally, some of the fuel gas that leaks from the piping 21 inside the front housing 110, or from the connection between the FC module 10 and the piping 21, may rise along the front surface 105F of the cabin 105.

In this example embodiment, the width of the front housing 110 is designed to be narrower than the wheel spacing of the front wheels 104F. This is different from passenger cars where the hood covers the left and right front wheels, and the width of the hood is larger than the wheel spacing of the front wheels. By making the width of the front housing 110 narrower than the wheel spacing of the front wheels 104F, the volume of the front housing 110 can be relatively small. By making the volume of the front housing 110 small, it is possible to easily detect leaked hydrogen gas by the fuel gas sensor before it becomes diluted.

As mentioned above, in this example embodiment, the height of the tank case 51 is highest at the top surface portion 51T, and the height of the curved portion 51C decreases as it approaches the side portion 51S. Therefore, hydrogen gas that leaks inside the tank case 51 tends to gather in the upper portion of the inner area rather than the peripheral area of the tank case 51.

In this example embodiment, the tank case 51 is provided behind the front housing 110 and at a higher position than the front housing 110. Therefore, when the front housing 110 and the tank case 51 are communicating through the piping 21, hydrogen gas that leaks inside the front housing 110 may enter the interior of the tank case 51 through some path. Among the "enclosures" of the FC power generation system, the tank case 51 is located at the highest position. Therefore, when the enclosures form a communicating space, hydrogen gas that leaks inside the enclosures tends to gather near the tank case 51, more specifically, near the top surface portion 51T of the tank case 51, which is the highest portion among the enclosures.

Figure 9B:
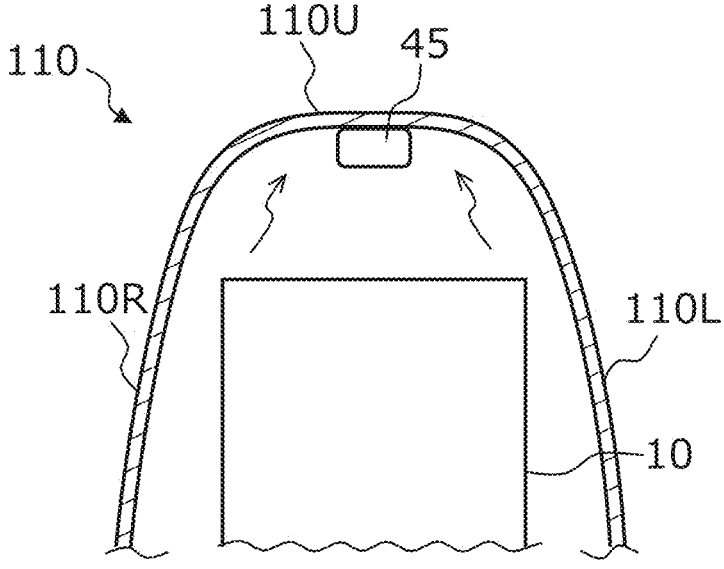
FIG. 9B shows a diagram schematically showing an arrangement example of a first sensor inside a front housing in an example embodiment of the present disclosure.

In the example of FIG. 9A, the fuel gas sensor includes a first sensor 45 provided inside the front housing 110 and a second sensor 46 provided inside the tank case. The first sensor 45 is positioned in a relatively high area inside the front housing 110, that is, an area where fuel gas accumulates. Specifically, the first sensor 45 is positioned in an area inside the front housing 110 where the front surface 105F of the cabin 105 and the upper surface 110O of the front housing 110 are close to each other. More precisely, as shown in FIG. 9B, the first sensor 45 is positioned in a space behind the FC module 10 and surrounded by the side surfaces 110L, 110R and the upper surface 110U of the front housing 110 on three sides. Furthermore, the first sensor 45 is positioned above the FC module 10.

The second sensor 46 is provided inside the tank case 51 at a higher position than the valve system 58, preferably on the underside of the top surface portion 51T of the tank case 51. The second sensor 46 is positioned higher than the first sensor 45 and functions as the fuel gas sensor placed at the highest position in the work vehicle 200.

Figure 10:
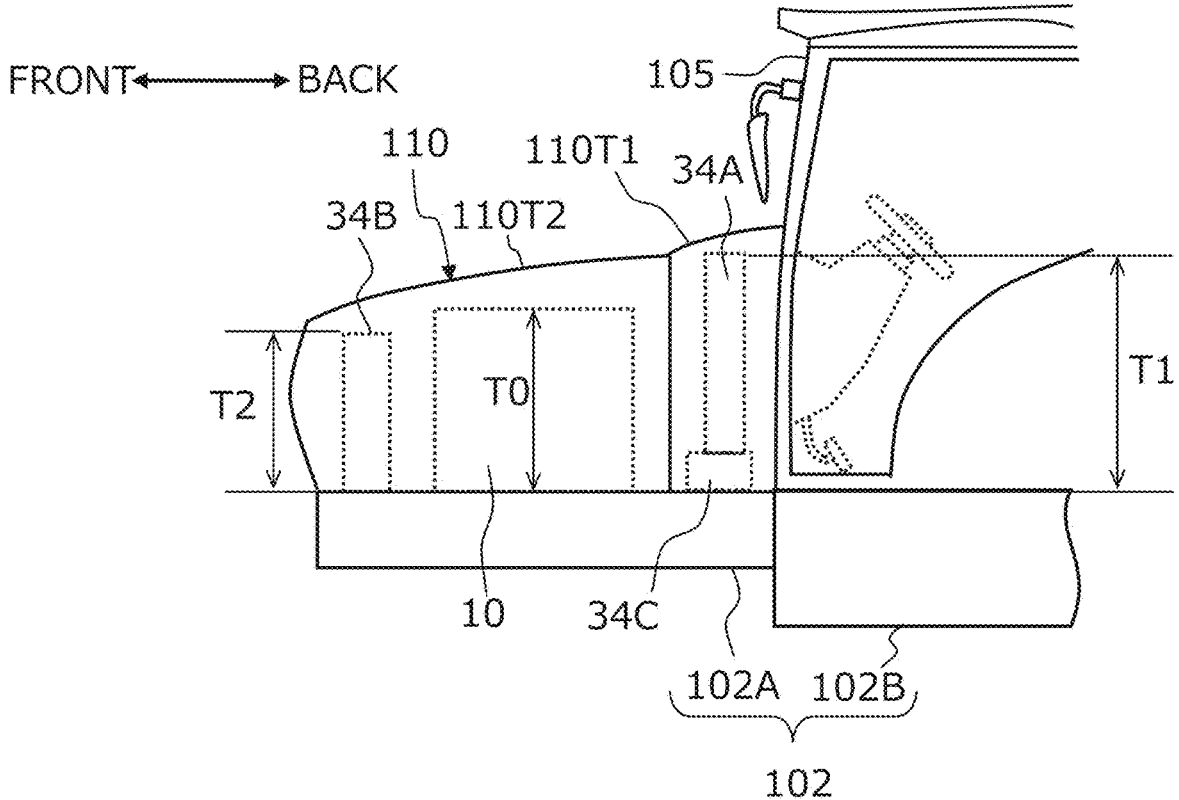
FIG. 10 shows a side view schematically showing an arrangement example of a radiator device in an example embodiment of the present disclosure.
Figure 11:
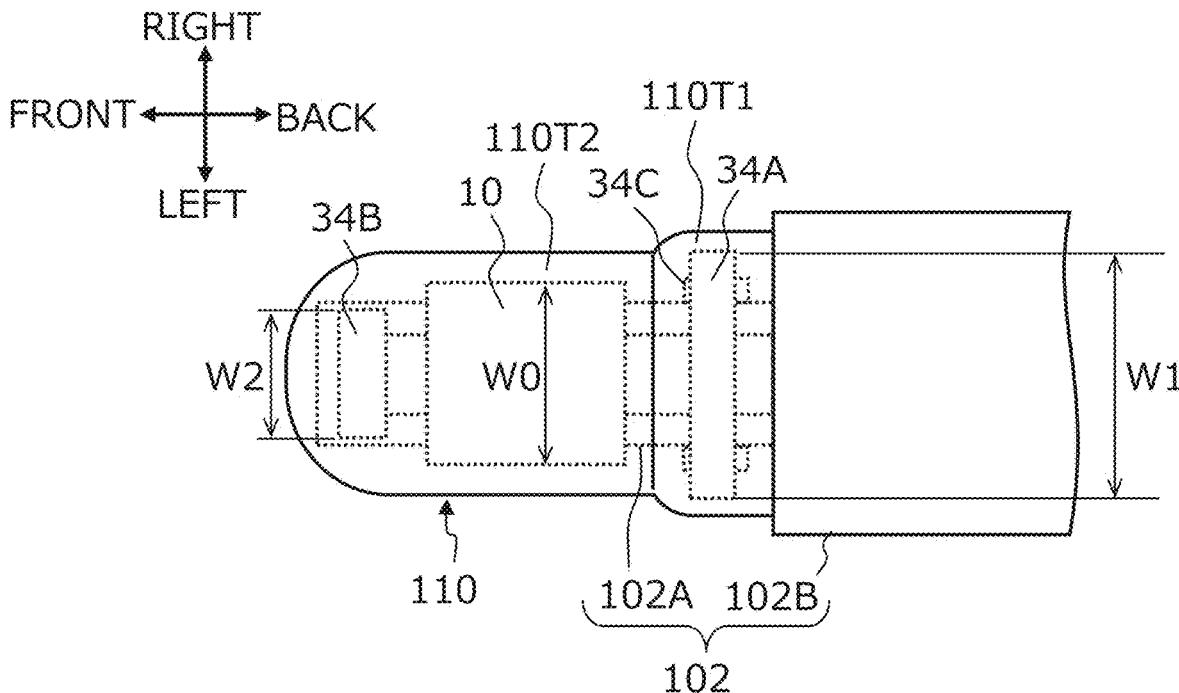
FIG. 11 shows a plan view schematically showing an arrangement example of a radiator device in an example embodiment of the present disclosure.

Next, referring to FIGS. 10 and 11, the configuration of the radiator device in this example embodiment will be explained. FIGS. 10 and 11, respectively, are side view and top view schematically showing an example placement of the radiator device in this example embodiment.

The work vehicle 200 of this example embodiment includes a cooling system in which coolant circulates via the coolant pumps 31A and 31B shown in FIG. 4, as mentioned earlier. And as shown in FIGS. 10 and 11, the work vehicle 200 includes a first radiator device 34A positioned on one side (the rear side) of the FC module 10 and a second radiator device 34B positioned on the other side (the front side) of the FC module 10.

The first radiator device 34A is connected to a flow path (first flow path) to cool the FC stack 11 (refer to FIG. 4) included in the FC module 10. On the other hand, the second radiator device 34B is connected to a flow path (second flow path) to cool electrical equipment, including the motor 70. In this manner, the cooling system in the work vehicle 200 of this example embodiment includes the first radiator device 34A to cool the FC stack 11, and the second radiator device 34B to cool other electrical equipment. It is desirable to enhance the ability to cool the FC stack 11 more than the ability to cool other electrical equipment. To enhance the cooling ability of radiator devices, it is necessary to expand the front surface area of the radiator devices and increase the area (core size) where the core portion of the heat exchanger contacts air. Therefore, in this example embodiment, the front surface area of the first radiator device 34A is larger than the front surface area of the second radiator device 34B. Specifically, as shown in FIG. 11, the width W1 of the first radiator device 34A is larger than the width W2 of the second radiator device 34B. Furthermore, in this example embodiment, the width W2 of the second radiator device 34B is smaller than the width W0 of the FC module 10, and the width W1 of the first radiator device 34A is larger than the width W0 of the FC module 10.

Positioning the first radiator device 34A at the rear of the FC module 10 makes it possible to achieve the following advantages.

First, the height and width of the front portion of the front housing 110 can be smaller than the height and width of the rear portion. Specifically, the front housing 110 in this example embodiment includes a first portion 110T1 positioned at the rear side and a second portion 110T2 positioned at the front side, and the height and width of the second portion 110T2 are smaller than the height and width of the first portion 110T1. On the contrary, if the first radiator device 34A of large size is placed in front of the FC module 10, or if both the first and second radiator devices 34A and 34B are placed in front of the FC module 10, it is necessary to expand the width of the second portion 110T2 of the front housing 110. However, if the width of the front housing 110 is made larger than the spacing between the left and right front wheels, covering the front wheels 104F with the front housing 110, when an operator seated in the driver seat 107 looks forward, the front housing 110 obstructs the view and reduces visibility of the position and direction of the front wheels 104F, thus it is difficult to steer accurately along farm roads or furrows, for example.

In contrast, according to this example embodiment, there is no need to expand the width of the second portion 110T2 of the front housing 110, so there is no problem of the view being narrowed by an expanded front housing 110 when the operator seated in the driver seat looks forward.

The first radiator device 34A can have a sufficient width W1 and height T1 by expanding the first portion 110T1 of the front housing 110 to the necessary extent. Here, the height difference T1–T2 between the two radiator devices 34A and 34B is in the range of 10 mm or more and 300 mm or less, for example, and the width difference W1–W2 is in the range of 20 mm or more and 500 mm or less, for example.

Additionally, by positioning the two radiator devices 34A and 34B on opposite sides, sandwiching the FC module 10, the problem of the two radiator devices 34A and 34B thermally interfering with each other is also solved.

It is desirable for the front housing 110 to have at least one opening portion that allows airflow to reach the first radiator device 34A and/or the second radiator device 34B. A portion of the opening portion can be realized by a gap between the first portion 110T1 and the second portion 110T2 of the front housing 110. This gap can be provided by making at least a portion of the height and width at the front end of the first portion 110T1 of the front housing 110 larger than the height and width at the rear end of the second portion 110T2.

It is preferable for the FC module 10 to be surrounded by a casing that includes sides and a top surface configured to guide the airflow from front to back. By adopting this configuration, it is possible to direct sufficient airflow to the first radiator device 34A positioned at the rear of the FC module 10, thereby the efficiency of heat exchange in the first radiator device 34A can be enhanced.

In this example embodiment, as shown in FIG. 10, the first radiator device 34A is fixed to the front frame 102A via a support portion 34C, and the upper end (height T1) of the first radiator device 34A is at a higher position than the upper end (height T2) of the second radiator device 34B. Specifically, the upper end (height T1) of the first radiator device 34A is higher than the height T0 of the FC module 10, and the upper end (height T2) of the second radiator device 34B is lower than the height T0 of the FC module 10. By adopting this configuration, the air introduced into the front housing 110 of the moving work vehicle 200 can flow smoothly towards the rear inside the front housing 110, allowing not only the second radiator device 34B but also the first radiator device 34A to properly perform heat exchange of the coolant.

It should be noted that the lower end of the first radiator device 34A is elevated by the support portion 34C. By using the support portion 34C, the first radiator device 34A can be positioned above the motor 70 (FIG. 5).

It should also be noted that an appropriate number of opening portions or gaps are provided in the front housing 110 as necessary. These opening portions or gaps can define and function as air inlets and outlets to provide airflow.

The following describes an agricultural tractor as an example of the work vehicle of this disclosure, referring to FIGS. 12 to 16, and as necessary, FIGS. 1 to 11. FIGS. 12, 13, 14, 15, and 16 are perspective, top, front, and rear views, respectively, of the agricultural tractor in this example.

The basic configuration of the agricultural tractor in this example is the same as that of the work vehicle in the example embodiment previously described. The following explains the differences between the present example embodiment and the example. In the drawings, the same reference numerals are given to corresponding components between the present example embodiment and the example.

Figure 13:
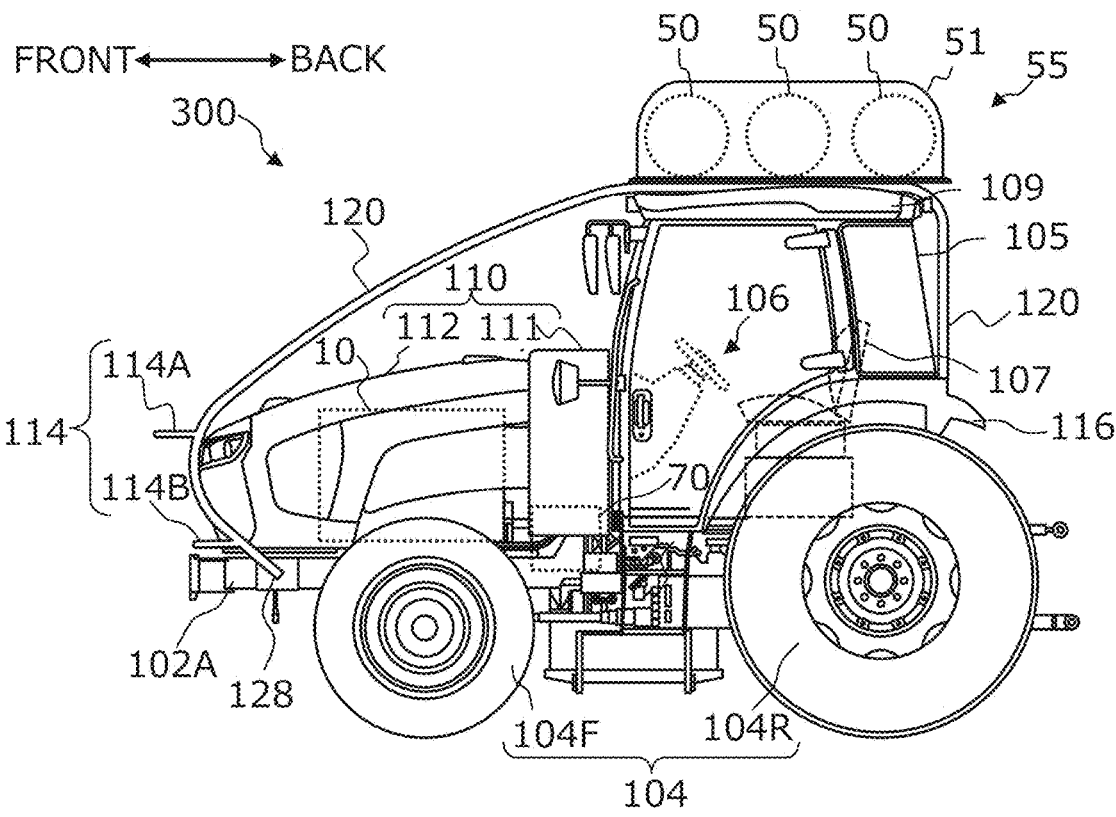
FIG. 13 shows a side view of an agricultural tractor according to an example embodiment of the present disclosure.

As shown in FIG. 13, the agricultural tractor 300 in this example includes a mounting frame 120 that is fixed to the vehicle frame 102 across the driver seat 107 and that supports a fuel tank module 55 including a fuel tank 50, and a front housing 110 that covers the fuel cell module 10. The front housing 110 can be opened and closed. Specifically, this front housing 110 includes a fixed housing portion 111 that is fixed to the vehicle frame 102, and a movable housing portion 112 that is supported to be openable and closable by the vehicle frame 102 or the fixed housing portion 111. The specific example configuration of the front housing 110 will be described later.

Figure 14:
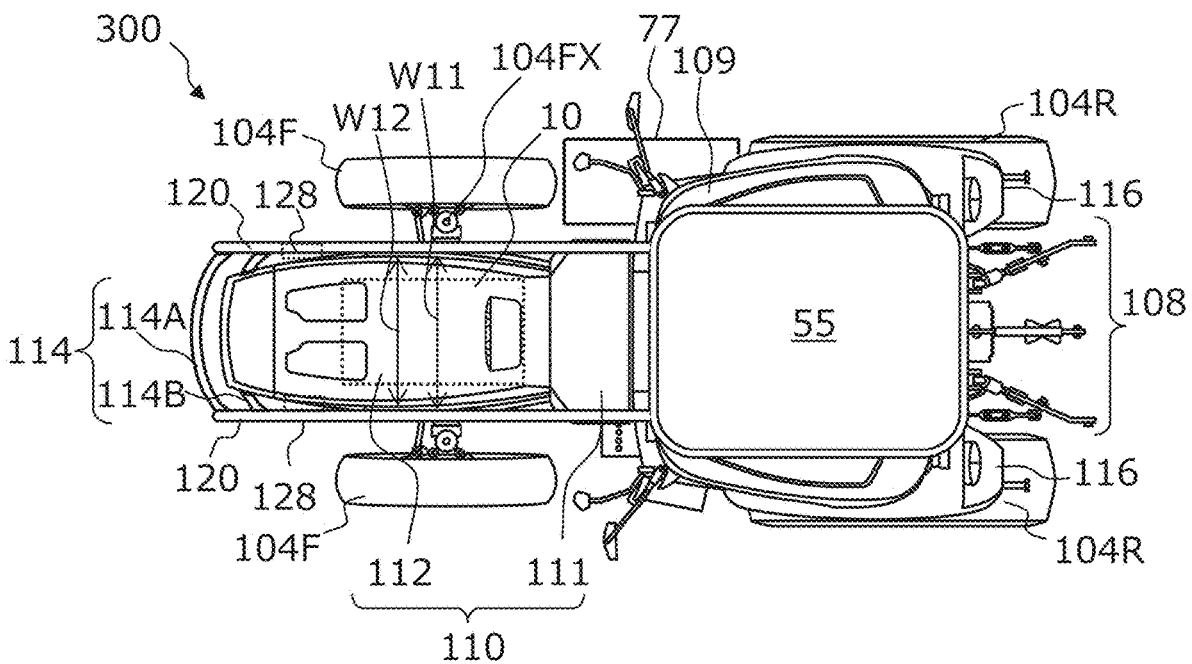
FIG. 14 shows a plan view of an agricultural tractor according to an example embodiment of the present disclosure.

In this example as well, the mounting frame 120 includes a left side frame and a right side frame. One end of each mounting frame 120 is fixed to the front frame 102A at a connection position 128 that is in front of the axle (front axle) 104FX of the front wheels 104F. As shown in FIG. 14, in a plan view (top view) looking down from above, the front housing 110 is positioned between the left side frame and the right side frame, and protrudes forward of the connection position 128.

The agricultural tractor 300 of this example includes a connecting bar 114 that connects the left side frame and the right side frame. The connecting bar 114 in this example includes a plurality of bars 114A and 114B disposed at different heights. As shown in the plan view of FIG. 14, the connecting bars 114A and 114B are connected to the left and right frames 120 at a position in front of the connection position 128 of the mounting frame 120. The connecting bar 114 has rigidity or mechanical strength to maintain a constant distance between the left and right mounting frames 120 even when an external force is applied to one or both of the left and right mounting frames 120. The connecting bar 114 is preferably formed of metal. The connecting bar 114 increases the overall structural strength of the mounting frame 120.

Figure 12:
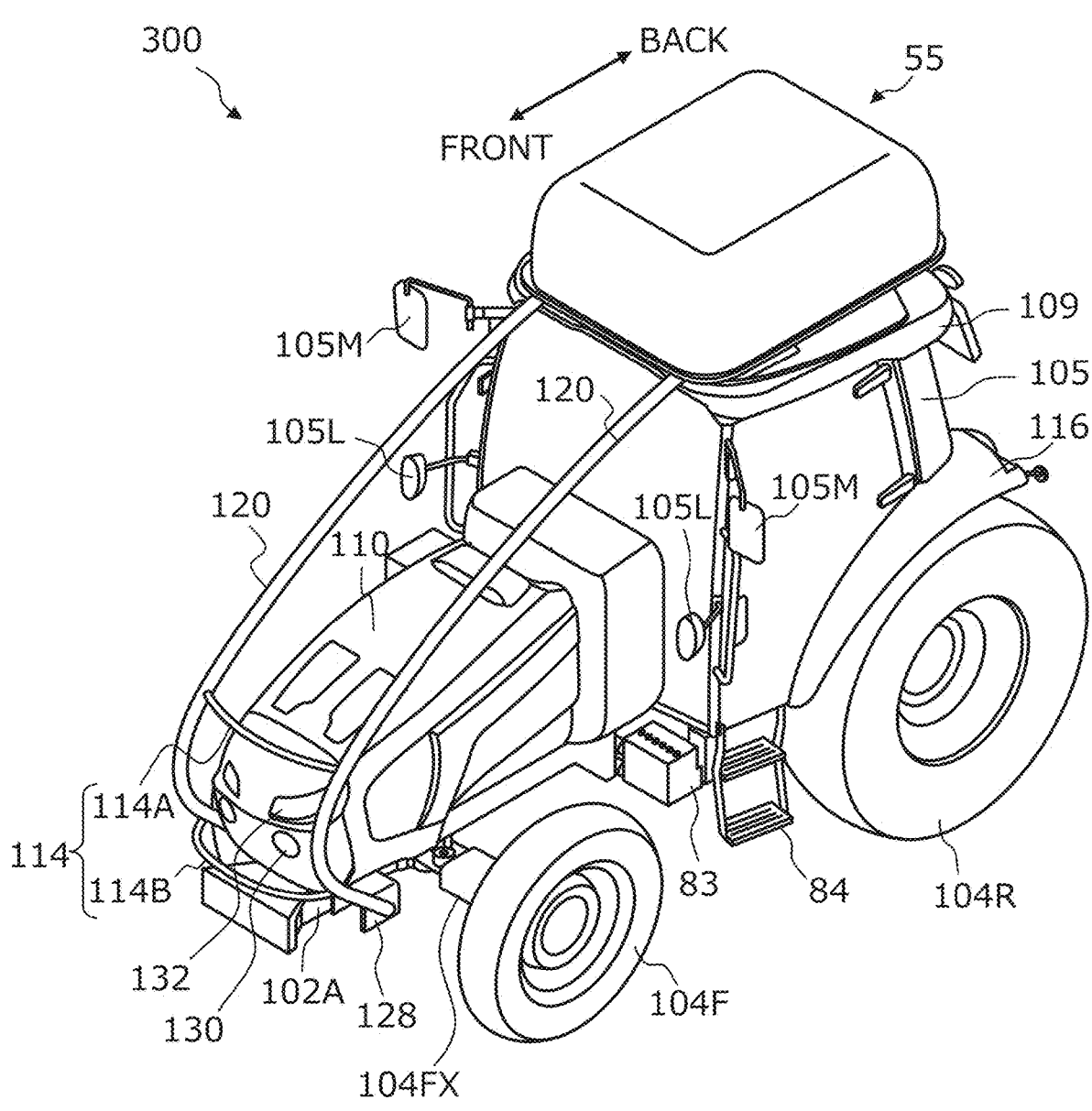
FIG. 12 shows a perspective view of an agricultural tractor according to an example embodiment of the present disclosure.

As shown in FIG. 12, the agricultural tractor 300 includes left and right back mirrors 105M and turn signal/clearance lights 105L attached to the cabin 105. FIG. 12 shows a lead-acid battery 83 and a step 84 to assist in getting in and out of the cabin 105. Headlamps 130 and work lights 132 are provided on the front portion of the front housing 110. A plurality of work lights are provided on the roof 109, and various sensor devices such as laser sensors for obstacle detection may also be provided. The positions of these devices and structural elements that are typically equipped on agricultural tractors are not limited to the illustrated examples.

Figure 15:
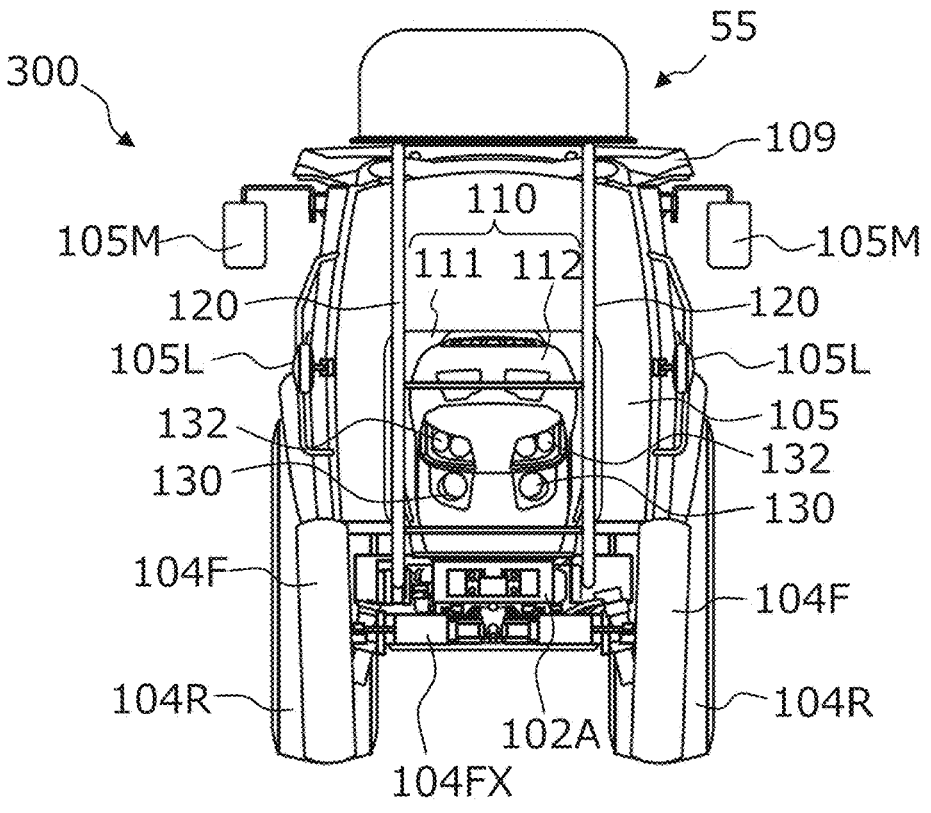
FIG. 15 shows a front view of an agricultural tractor according to an example embodiment of the present disclosure.
Figure 16:
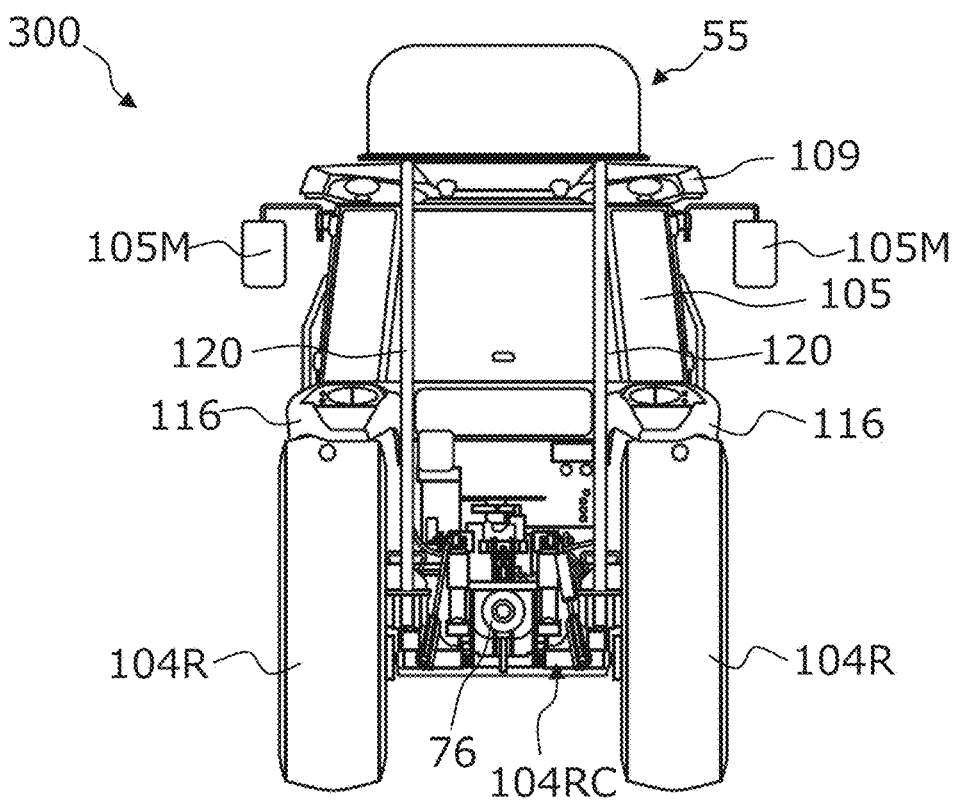
FIG. 16 shows a rear view of an agricultural tractor according to an example embodiment of the present disclosure.

As shown in FIGS. 15 and 16, in the agricultural tractor 300 of this example, the fuel tank module 55 is positioned above the cabin 105, and the left and right mounting frames 120 supporting the fuel tank module 55 are positioned across the cabin 105. As shown in FIG. 16, the portion of the mounting frame 120 positioned behind the cabin 105 extends vertically between the left and right rear fenders 116. The rear ends of each mounting frame 120 are fixed to the rear axle case (rear axle) 104RC.

Figure 17:
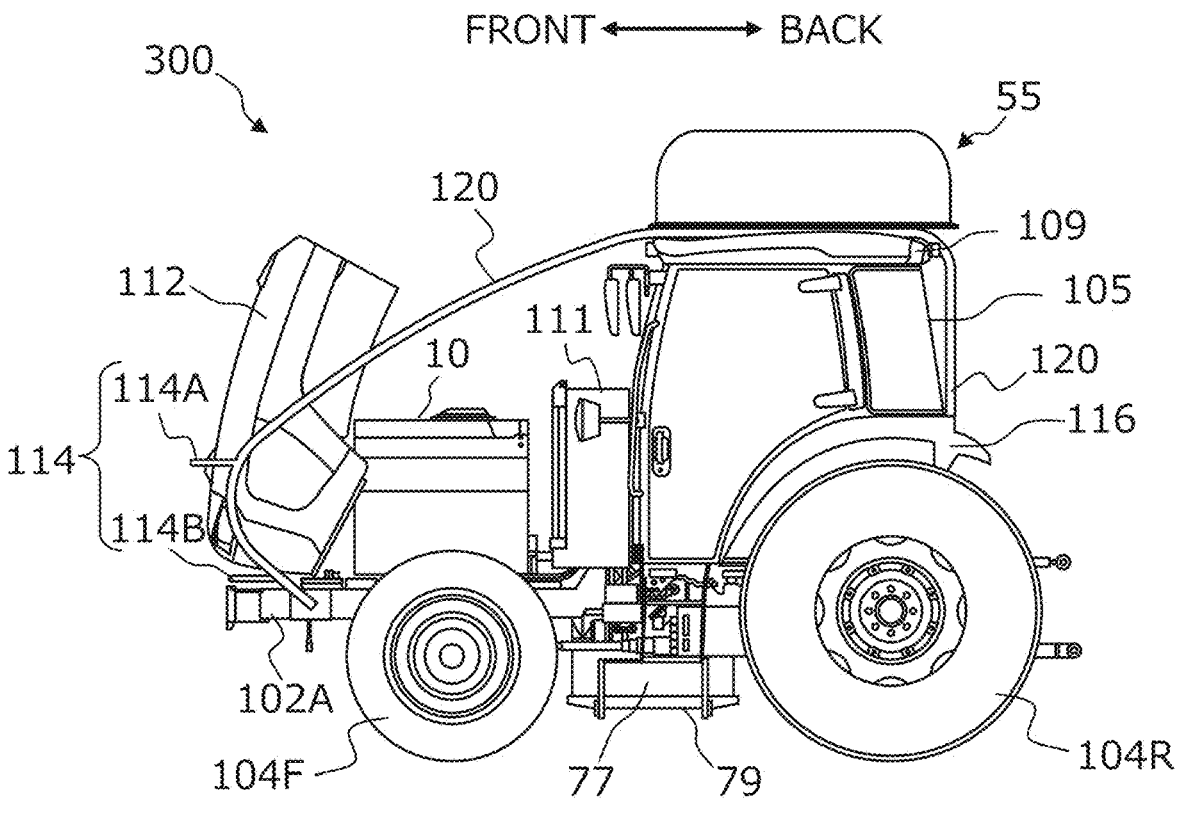
FIG. 17 shows a side view of an agricultural tractor with a front housing in an open state according to an example embodiment of the present disclosure.
Figure 18:
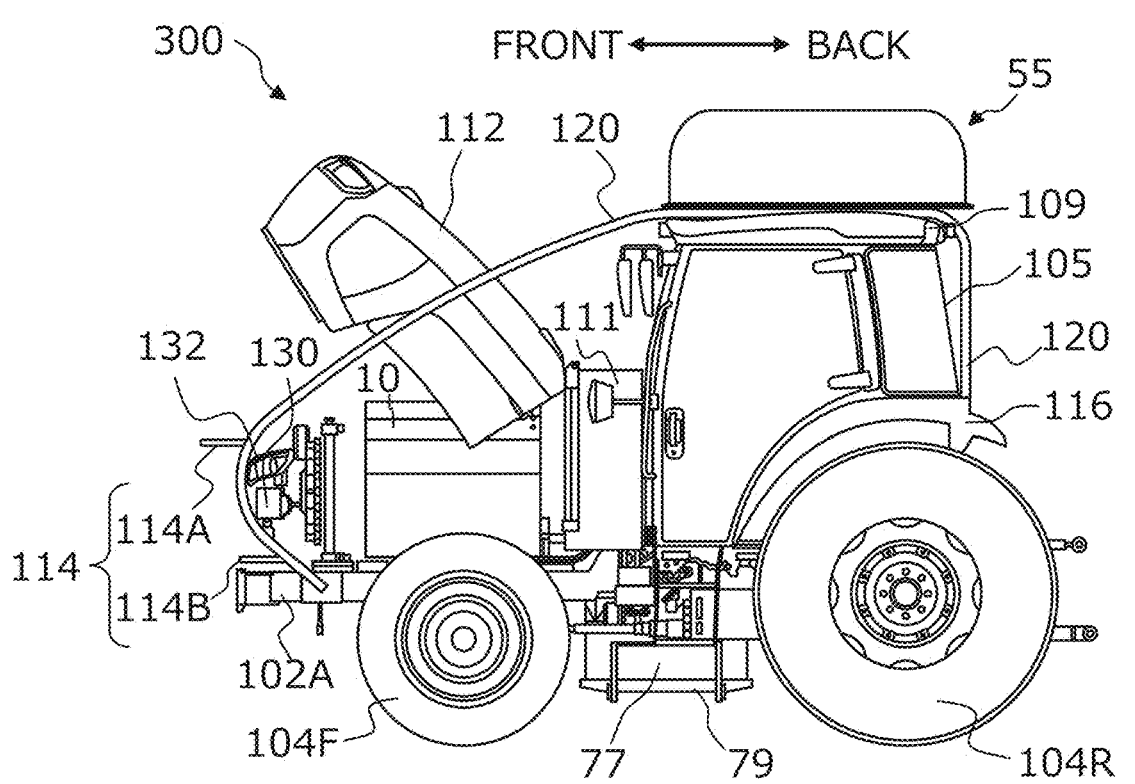
FIG. 18 shows a side view of an agricultural tractor with a front housing in an open state in a modified example of an example embodiment of the present disclosure.

The following describes an example configuration of the movable housing portion 112. In this example, FIG. 17 is a side view of the agricultural tractor 300 with the front housing 110 in an open state. The front housing 110, specifically the movable housing portion 112, is configured to rotate around a rotation axis positioned in front of the axle (front axle 104FX: see FIG. 12) of the front wheels 104F. The position of the rotation axis is defined by a rotational support device such as a hinge. In the example of FIG. 17, the front lower end of the movable housing portion 112 is connected to the front frame 102A by a rotational support device. The position of the rotation axis is not limited to this example. As shown in FIG. 18, the movable housing portion 112 may be configured to rotate around a rotation axis that is behind the axle position of the front wheels 104F. In the example of FIG. 18, a rotational support such as a hinge is provided on the fixed housing portion 111.

In this example, the movable housing portion 112 is configured to house the fuel cell module 10. In contrast, the fixed housing portion 111 houses devices included in the fuel cell power generation system, specifically, a radiator device 34A that dissipates heat from the coolant for the fuel cell.

An important point in this example is that the mounting frame 120 has a shape that does not interfere with the front housing 110 (specifically the movable housing portion 112) when the position or orientation of the front housing 110 changes from the closed state to the open state. In other words, in the mounting frame 120 in front of the cabin 105, the distance (spacing) W11 between one and the other of the mounting frames 120 is set to be larger than the maximum width W12 of the movable housing portion 112.

Figure 19:
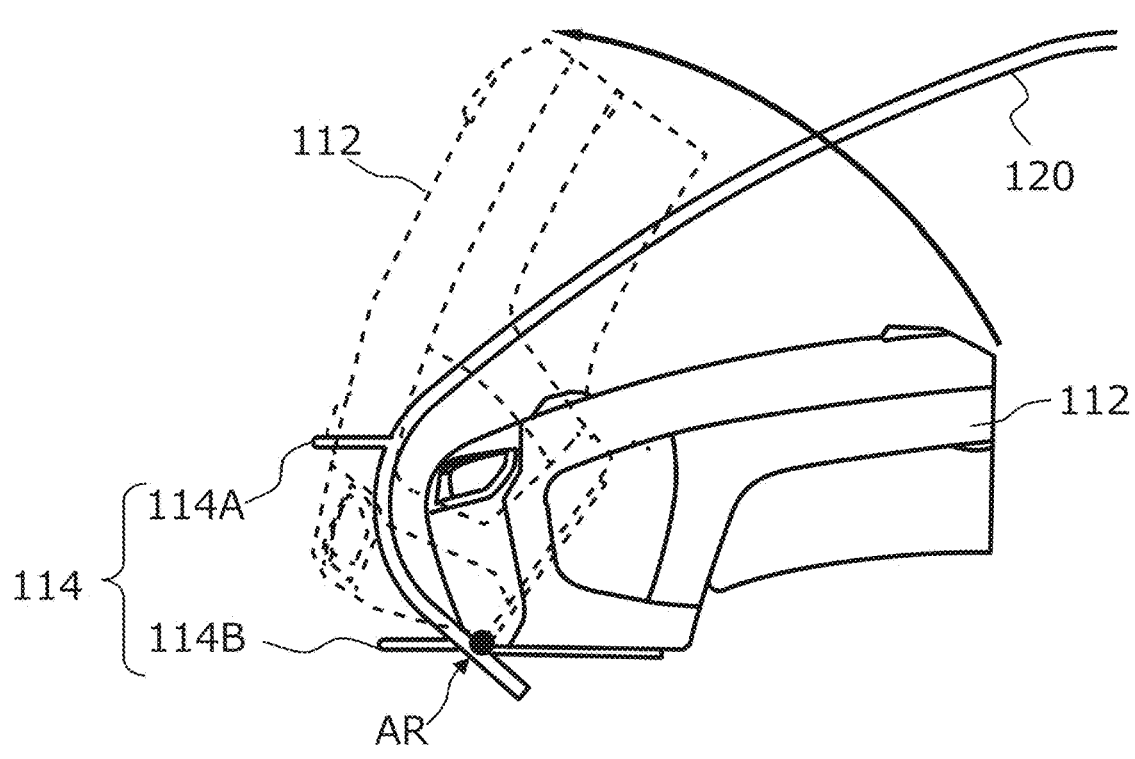
FIG. 19 shows a side view schematically showing a movable range of a movable housing portion in an example embodiment of the present disclosure where a rotation axis is located at a front of the movable housing portion.
Figure 20:
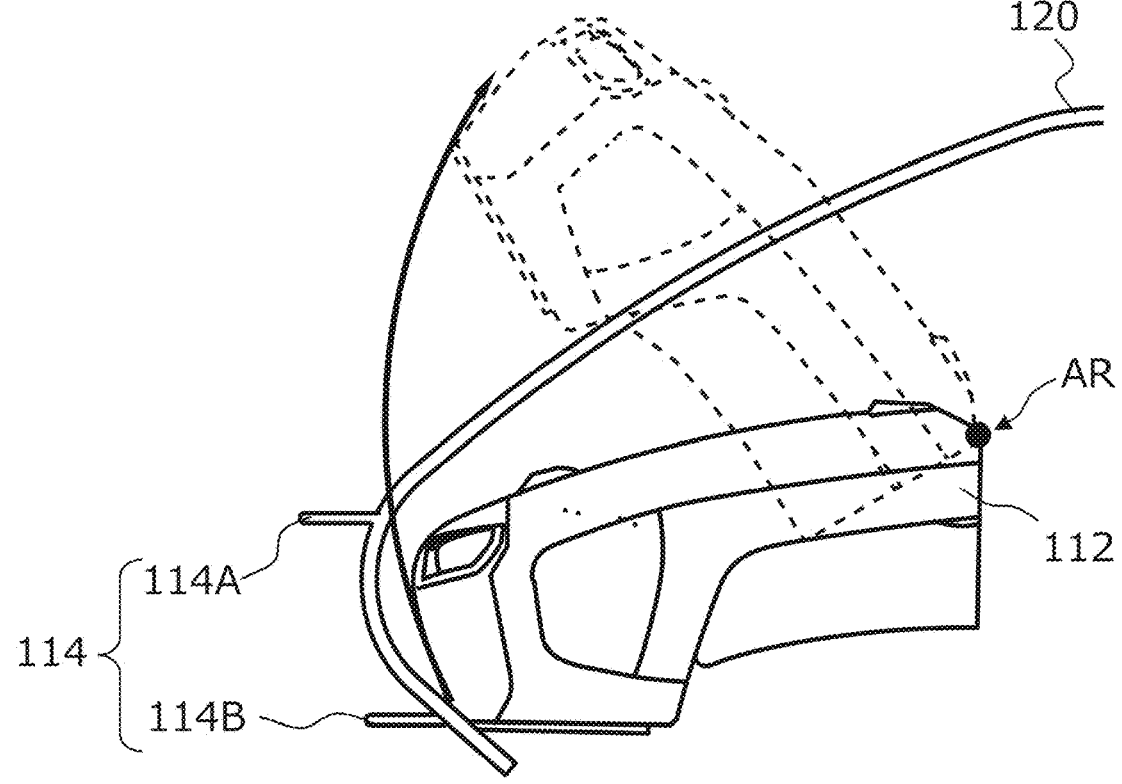
FIG. 20 shows a side view schematically showing a movable range of a movable housing portion in an example embodiment of the present disclosure where a rotation axis is located at a rear of a movable housing portion.

Referring to FIGS. 19 and 20, the position and shape of the connecting bar 114 in this example will be described. FIG. 19 is a side view schematically showing the movable range of the movable housing portion 112 in a form where the rotation axis AR is positioned at the front of the movable housing portion 112. In contrast, FIG. 20 is a side view schematically showing the movable range of the movable housing portion 112 in a form where the rotation axis AR is located at the rear of the movable housing portion 112. In FIGS. 19 and 20, the movable housing portion 112 shown by solid lines is in the "closed state," and the movable housing portion 112 shown by dotted lines is in the "open state." In each figure, the position of the rotation axis AR perpendicular to the paper plane is indicated by a black dot. The rotational motion of the movable housing portion 112 when changing from the "closed state" to the "open state" is schematically shown by solid arrows.

The connecting bar 114 connecting the left and right mounting frames 120 is placed outside the movable range of the movable housing portion 112. In the example of FIG. 19, the connecting bars 114 (connecting bars 114A, and 114B) are positioned in front of the movable housing portion 112 when the front housing 110 is in the "open state," thereby having shapes that do not interfere with the movable housing portion 112.

In this example, the connecting bars 114 have shapes that protrude convexly forward in the plan view of FIG. 14. Therefore, when the movable housing portion 112 has a curved shape that is highest at the center of its upper surface, the connecting bars 114 can efficiently provide a space that appropriately accommodates the movable housing portion 112 in the "open state."

As shown in FIGS. 14, 19, and 20, the connecting bar 114A at a relatively high position protrudes farther forward than the connecting bar 114B at a relatively low position. This configuration allows for increasing the angle (movable angle) that defines the movable range of the movable housing portion 112 in the configuration example shown in FIG. 19. In the configuration example shown in FIG. 20, because the position of the rotation axis AR is high, the frontmost point of the movable range of the movable housing portion 112 also rises to a relatively high position, but it is possible to appropriately isolate the upper connecting bar 114A from the movable range.

The two connecting bars 114A and 114B in this example also serve to reduce or prevent collision of the front housing 110 with an obstacle and protect the front housing 110 when, for example, the front of the front housing 110 approaches some obstacle during travel. A third connecting bar may be provided at a position outside the movable range of the movable housing portion 112 shown in FIGS. 19 and 20.

In this example, because the fixed housing portion 111 is positioned behind the movable housing portion 112, the movable housing portion 112 is positioned forward by the length of the fixed housing portion 111 in the front-back direction of the vehicle frame 102. When, for example, the front frame and the front housing in an existing agricultural tractor are adopted without changing each length as the front frame 102A and the movable housing portion 112, the position of the front end of the movable housing portion 112 relative to the front end position of the front frame 102A shifts forward by the length of the fixed housing portion 111 described above. Therefore, in such case, it is particularly desirable to adopt the above configuration to ensure that the connecting bar 114 does not interfere with the movable housing portion 112. Additionally, it is also preferable to set the position where the mounting frame 120 and the connecting bars 114A and 114B are connected and fixed relatively forward. The mounting frame 120 in this example is curved to protrude forward, as shown in FIGS. 19 and 20, for example, but this has the advantage of making it easier to provide the connecting bar 114 in a position that does not interfere with the movable housing portion 112.

Figure 21:
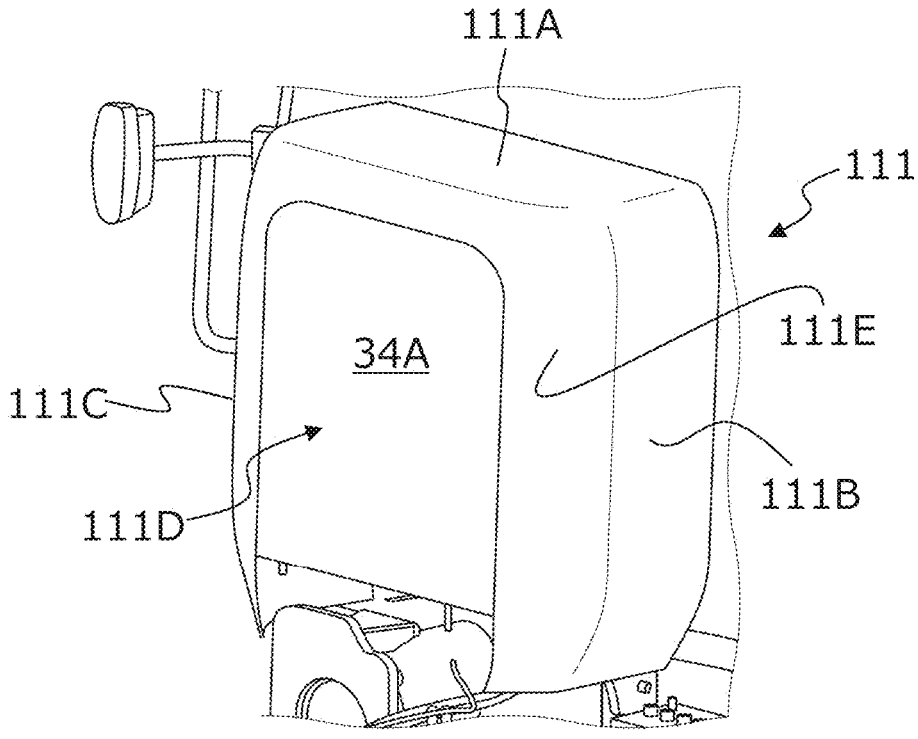
FIG. 21 shows a perspective view of a fixed housing portion according to an example embodiment of the present disclosure.
Figure 22:
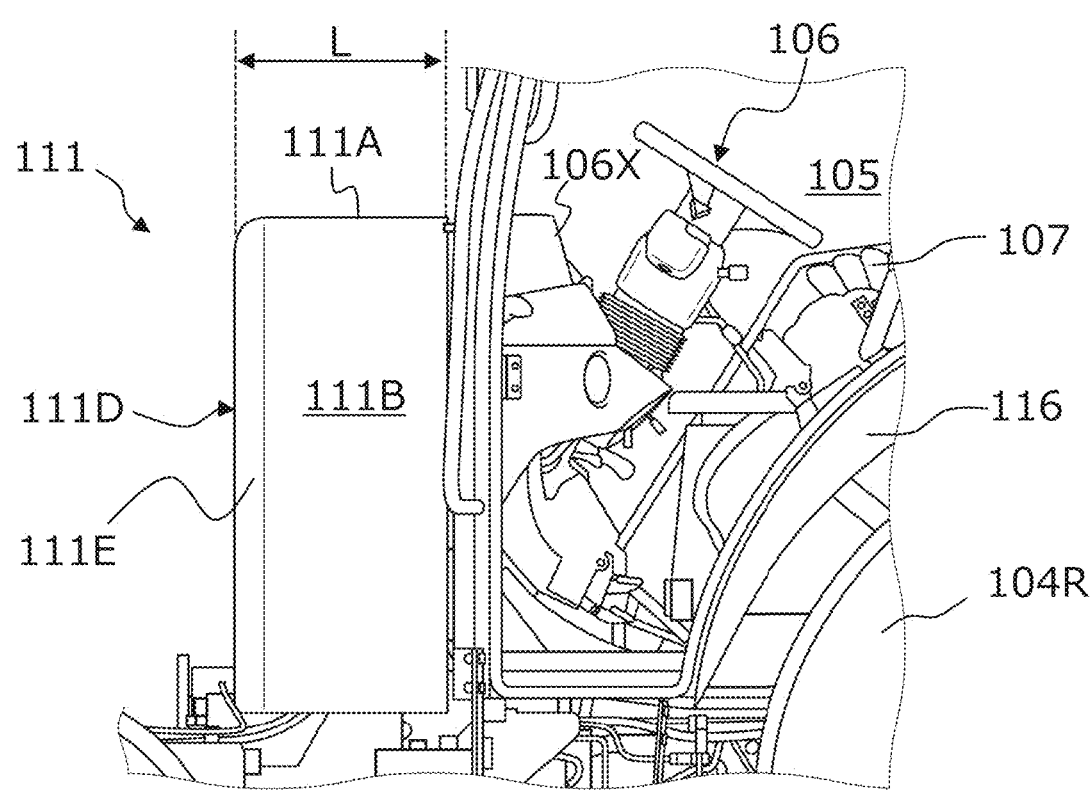
FIG. 22 shows a side view of a fixed housing portion according to an example embodiment of the present disclosure.
Figure 23:
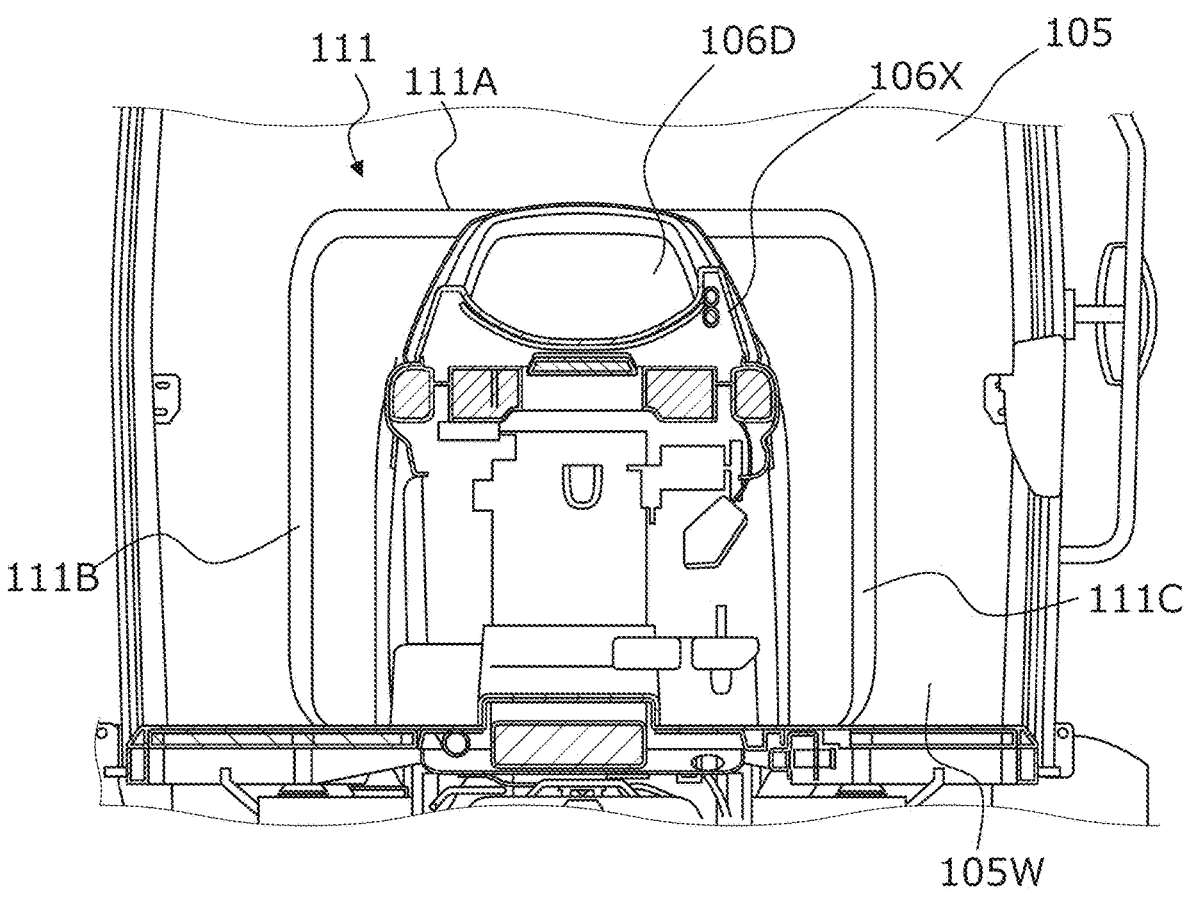
FIG. 23 shows a diagram showing an arrangement relationship between a fixed housing portion and a handle stay cover according to an example embodiment of the present disclosure.

Next, referring to FIGS. 21 to 23, an example configuration of the fixed housing portion 111 in this example will be described. FIGS. 21 and 22 are perspective and side views, respectively, of the fixed housing portion 111 in this example. FIG. 23 is a diagram showing the arrangement relationship between the fixed housing portion 111 and the handle stay cover 106X. Note that the steering wheel is omitted in FIG. 23.

The fixed housing portion 111 houses a component (in this example, the radiator device 34A) that has a size exceeding a capacity of the movable housing portion 112. It is preferable that the maximum width inside the fixed housing portion 111 is larger than the maximum width inside the movable housing portion 112. The fixed housing portion 111 is positioned behind the movable housing portion 112. When housing the radiator device 34A inside the fixed housing portion 111, an air cooling fan for the radiator device 34A may also be housed inside the fixed housing portion 111. This air cooling fan may face the back or front of the radiator device 34A.

The fixed housing portion 111 in this example includes a top portion 111A, a pair of side portions 111B and 111C, and a front wall 111E. The front wall 111E is located on the side of the movable housing portion 112 and includes an opening portion 111D that communicates with the interior of the movable housing portion 112 in the closed state. Through this opening portion 111D, components placed inside the fixed housing portion 111 and components placed inside the movable housing portion 112 can be connected by piping, coolant flow paths, electrical cables, and other similar connecters. The front wall 111E faces the rear end of the movable housing portion 112 in the closed state. Therefore, the opening portion 111D of the fixed housing portion 111 is blocked by the movable housing portion 112 in the closed state. However, there may be a gap between the movable housing portion 112 in the closed state and the fixed housing portion 111. This gap allows the flow of air.

As shown in FIG. 22, in front of the driver seat 107, a handle stay cover 106X with a steering wheel 106 is positioned. The fixed housing portion 111 is located in front of the handle stay cover 106X. In FIG. 22, the length "L" of the fixed housing portion 111 in the front-back direction of the vehicle frame 102 is shown. The fixed housing portion 111 with the length L is positioned between the movable housing portion 112 and the cabin 105. As mentioned earlier, the front end of the movable housing portion 112 shifts forward by this length L.

As shown in FIG. 23, when an operator seated in the driver seat inside the cabin 105 looks forward, the fixed housing portion 111 is positioned beyond the handle stay cover 106X. The cabin 105 includes glass 105W on all four sides surrounding the driver seat. Glass 105W is positioned between the inside of the cabin 105 and the fixed housing portion 111. The width of the fixed housing portion 111 is wider than the width of the handle stay cover 106X, but the height of the fixed housing portion 111 is lower than the height of the handle stay cover 106X. A display 106D to display various information including vehicle speed is provided on the handle stay cover 106X. The height of the fixed housing portion 111 may be designed to be no larger than the height of the handle stay cover 106X so that the fixed housing portion 111 does not obstruct the forward view for the operator who alternately looks at the front of the agricultural tractor 300 and the display 106D.

In this example, not the entire front housing 110 opens and closes, but rather a portion of the front housing 110 functions as a fixed housing portion 111, while the remaining portion defines and functions as a movable housing portion 112. This configuration reduces the difficulty of opening and closing operations that may arise when the front housing 110 becomes large, making it easier for operators to perform maintenance and other tasks. Especially when there are components too large to be accommodated in a typical-sized front housing, rather than increasing the size of the entire front housing that opens and closes larger, this configuration offers the advantage of not requiring enlargement of the opening and closing portion (movable housing portion) if such large components are housed in the fixed housing portion. While these advantages are particularly effective for work vehicles including a fuel cell power generation system, they are also effective for agricultural tractors including other drive systems. In other words, the benefit of dividing the so-called bonnet into a plurality of portions and making one of them capable of opening and closing operations is also effective for agricultural tractors including internal combustion engines or battery-driven motors.

Figure 24:
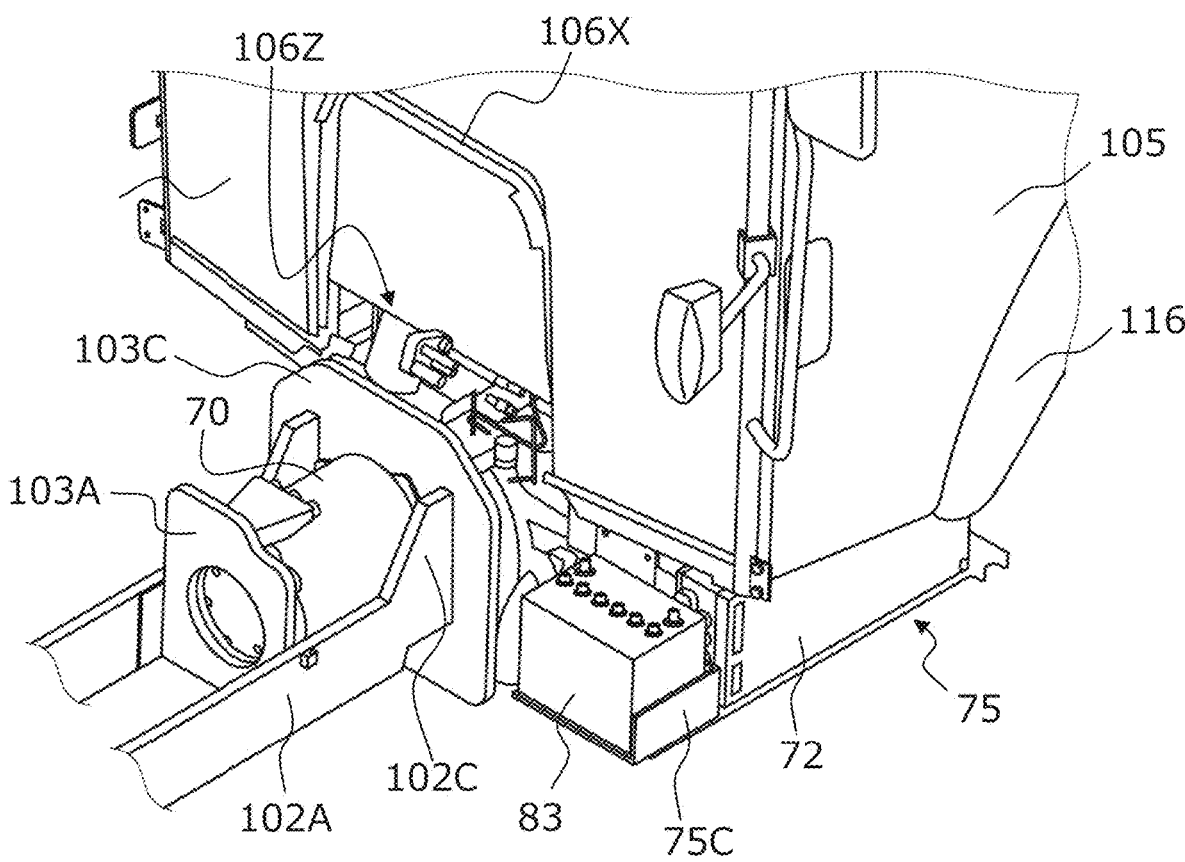
FIG. 24 shows a perspective view showing an arrangement of an inverter device according to an example embodiment of the present disclosure.
Figure 25:
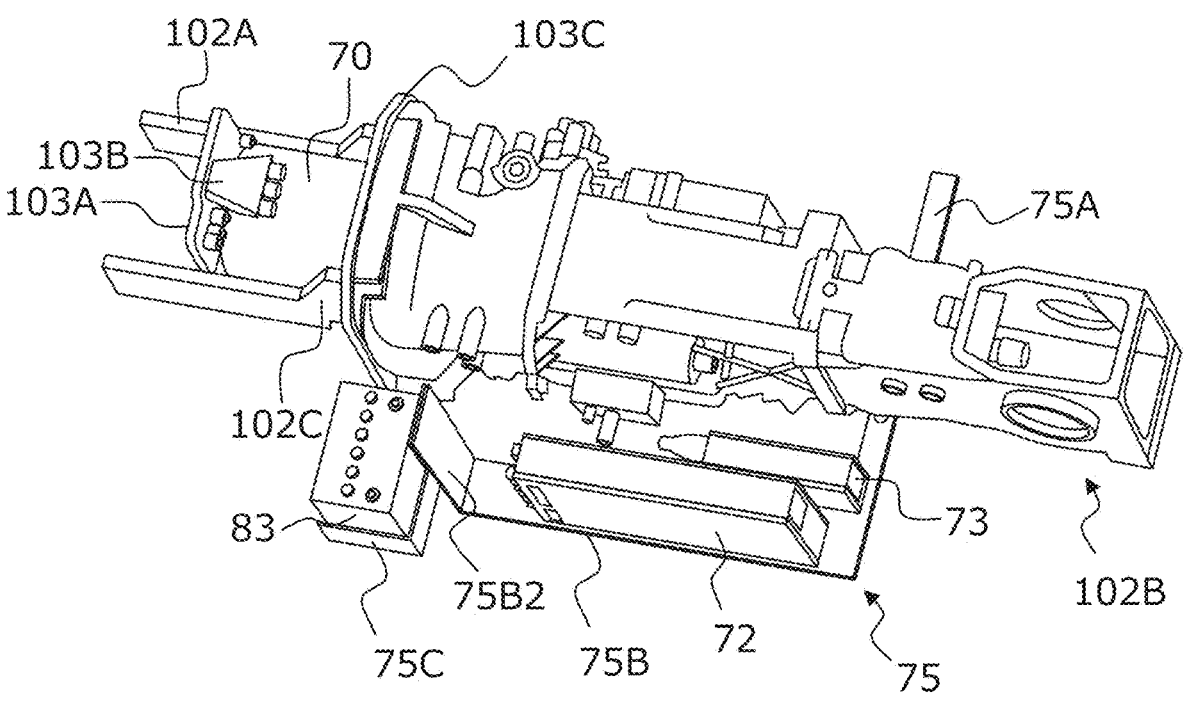
FIG. 25 shows a perspective view showing an arrangement relationship between an inverter device and a transmission case according to an example embodiment of the present disclosure.
Figure 26:
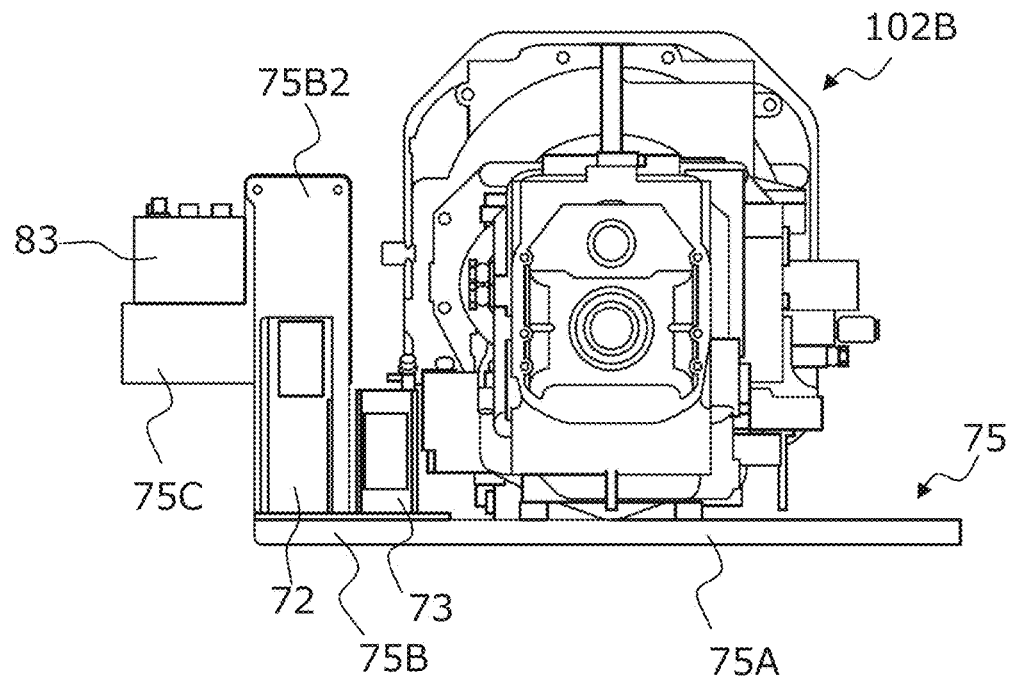
FIG. 26 shows a rear view showing an arrangement relationship between an inverter device and a transmission case according to an example embodiment of the present disclosure.
Figure 27:
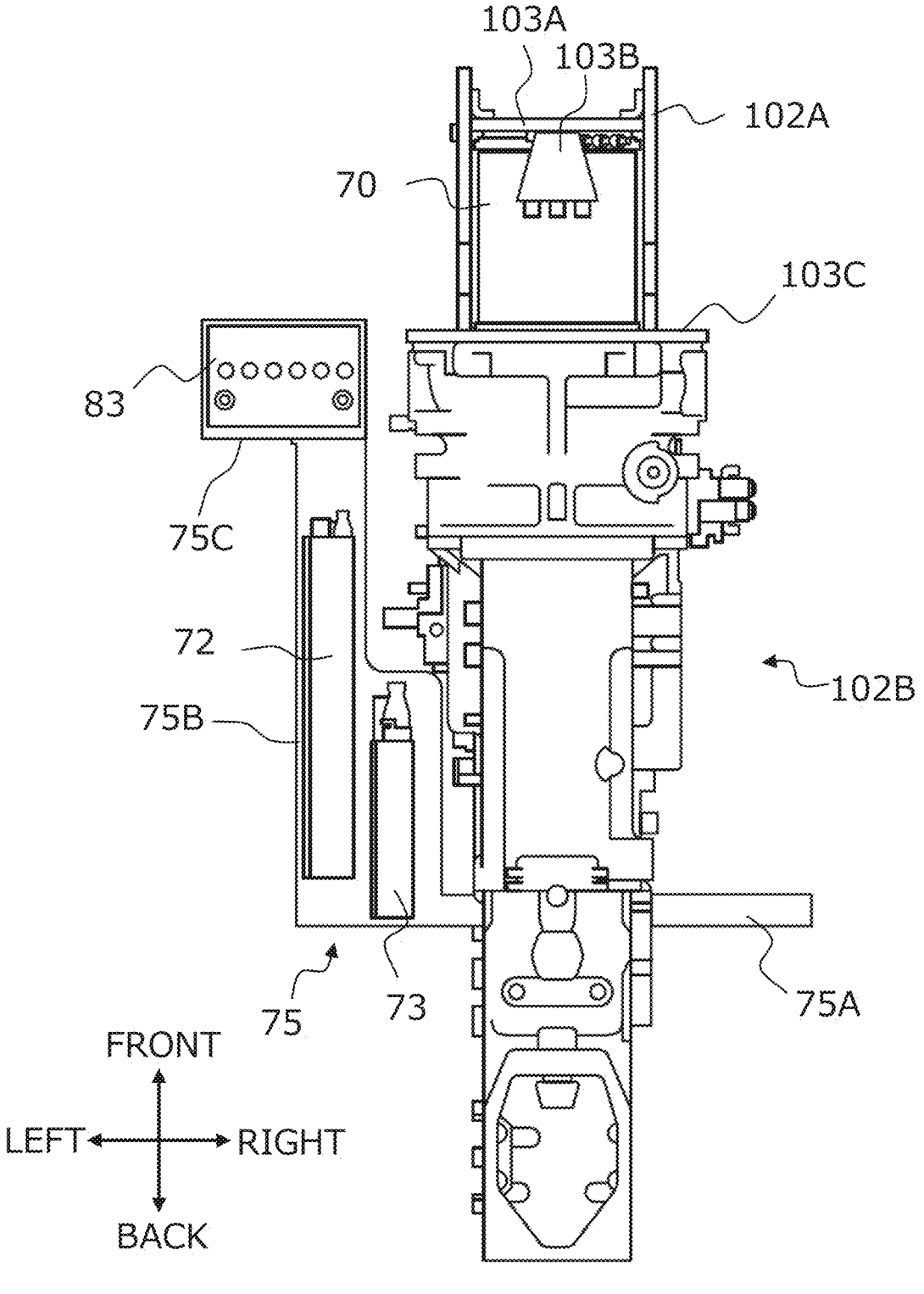
FIG. 27 shows a top view showing an arrangement relationship between an inverter device and a transmission case according to an example embodiment of the present disclosure.

FIG. 24 is a perspective view showing the placement of the inverter device 72 in this example. In FIG. 24, the description of the front housing (bonnet) 110 and the radiator device 34A is omitted. FIG. 25 is a perspective view showing the arrangement relationship between the inverter device 72 and the transmission case 102B. FIGS. 26 and 27 are rear and top views, respectively, showing the arrangement relationship between the inverter device 72 and the transmission case 102B.

FIG. 24 shows the motor 70, which would normally be difficult to see due to various components housed in the front housing 110. Furthermore, FIG. 24 shows the front portion of the handle stay cover 106X inside the cabin 105 and the lower end of the steering pipe 106Z that rotatably supports the steering shaft.

The motor 70 is supported by the front frame 102A. The rear end portion 102C of the front frame 102A is fixed to the front end portion 103C of the transmission case 102B, for example, by welding. The size in the height direction of the rear end portion 102C of the front frame 102A is enlarged compared to other portions of the front frame 102A, aiming to improve the connection strength to the front end portion 103C of the transmission case 102B. Note that in FIG. 24, the fixed housing portion 111 (not shown in FIG. 24) previously mentioned is positioned above the motor 70 and in front of the handle stay cover 106X.

The motor 70 is supplied with U-phase, V-phase, and W-phase alternating current from the inverter device 72. In the example illustrated, the stator coil inside the motor 70 and the wiring from the inverter device 72 are connected via three-phase terminals 103B provided on the motor fixing part 103A. A sensor to detect the rotation of the rotor is provided in the motor 70. The sensor is connected to an unillustrated motor control circuit. The output (power) of the motor 70 can be determined to the require amplitude depending on the size, weight, and application of the work vehicle.

The output shaft of the motor 70 is connected to the main shaft of the transmission device such as a transmission housed in the transmission case 102B. The internal configuration of the transmission case 102B can be similar to the configuration of the transmission device in a known agricultural tractor. An example of the transmission device is disclosed in International Publication No. WO 2022/038860, the entire contents of which are incorporated herein by reference.

In this example, the inverter device 72 is disposed on the side of the transmission case 102B and is positioned below the cabin 105. More specifically, a support 75 supporting the inverter device 72 is fixed to the transmission case 102B. The support 75 includes a first portion 75A connected to the lower portion of the transmission case 102B and a second portion 75B extending parallel to the transmission case 102B in the plan view of FIG. 27. The inverter device 72 is disposed on the second portion 75B. By using this support 75, it is possible to effectively utilize the free space provided under the cabin 105 to accommodate the inverter device 72.

In this example, the inverter device 72 is placed close to the motor 70, which is positioned near the front end portion 103C of the transmission case 102B. Therefore, it is possible to shorten the length of the wiring connecting the inverter device 72 and the motor 70. The inverter device 72 includes semiconductor switches such as a plurality of power transistors, which tend to generate heat and become hot during operation. By positioning the inverter device 72 below the cabin 105 rather than housing it in the front housing 110, as in this example, it is also possible to promote heat dissipation from the inverter device 72.

In this example, components (e.g., electronic components such as capacitors) 73 other than the inverter device 72 may be mounted on the second portion 75B of the support 75. Additionally, the support 75 includes a third portion 75C that supports electrical equipment other than the inverter device 72. The third portion 75C is fixed to an extension portion 75B2 that is vertically bent upward at the front end of the second portion 75B. In the plan view of FIG. 27, the third portion 75C of the support 75 is positioned in front of the second portion 75B. A storage battery 83 is positioned on the third portion 75C.

As shown in FIG. 24, in a plan view looking down from directly above, at least a portion of the upper surface of the storage battery 83 is exposed and is in a position that does not overlap with the cabin 105. Furthermore, as shown in FIG. 26, the third portion 75C, on which the storage battery 83 is placed, is at a higher position than the second portion 75B. By adopting this configuration, it is easy for the operator to access the storage battery 83. According to this example, it is easy for the operator to perform necessary tasks for maintenance of the storage battery 83, such as liquid replacement, thus increasing work efficiency.

Other components may be placed on the third portion 75C instead of, or along with, the storage battery 83. The height difference between the second portion 75B and the third portion 75C can be determined to make it easy for the operator to work on the components placed on the third portion 75C.

Figure 28:
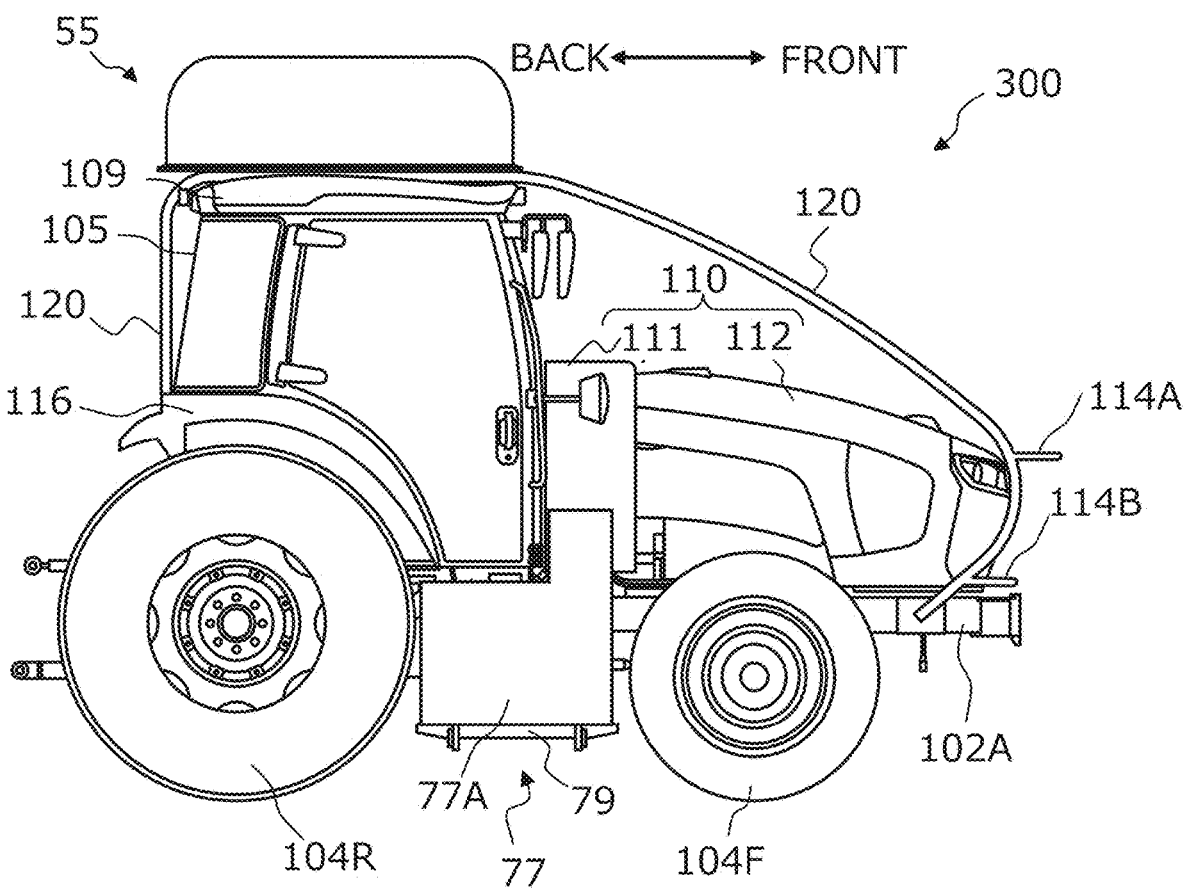
FIG. 28 shows a side view showing an electrical circuit module according to an example embodiment of the present disclosure.
Figure 29:
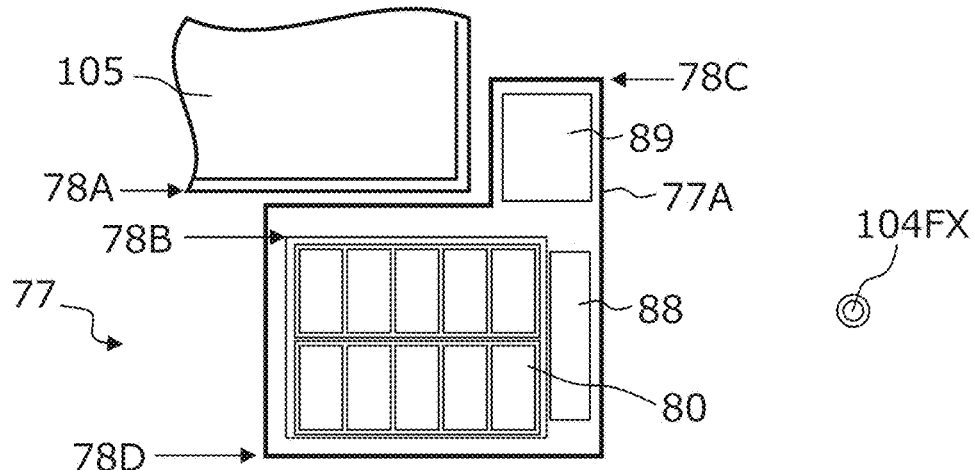
FIG. 29 shows a diagram schematically showing the configuration of an electrical circuit module according to an example embodiment of the present disclosure.

Next, referring to FIGS. 28 and 29, an example configuration of the electrical circuit module equipped in the agricultural tractor of this example will be described. FIG. 28 is a side view showing the electrical circuit module 77 in this example, and FIG. 29 is a diagram schematically showing the configuration of the electrical circuit module 77.

The agricultural tractor 300 in this example includes an electrical circuit module 77 housed in a casing 77A, and the electrical circuit module 77 is positioned on the side of the vehicle frame 102. In other words, the electrical circuit module 77 is positioned on one side of the vehicle frame 102 and the inverter device 72 is positioned on the other side of the vehicle frame 102. More specifically, in this example, the electrical circuit module 77, which includes circuits electrically connected to the FC module 10 and the motor 70, is fixed to the right side of the vehicle frame 102 sandwiched between the front wheels 102F and the rear wheels 102R (see FIG. 14). Specifically, the casing 77A of the electrical circuit module 77 is supported by a support 79 fixed to the transmission case 102B. The support 79 may be fixed to the lower end of the transmission case 102B, similar to the support 75 for the inverter device 72 described earlier. The support 75 and the support 79 may be integrally formed from the same metal structure.

The electrical circuit module 77 may include, for example, a plurality of battery packs 80, a battery management unit 88, and various electrical circuits 89 such as ECU or voltage conversion circuits placed inside the casing 77A. The electrical circuits 89 may include circuits that define and function as part of the inverter device 72.

In the side view of FIG. 28, the casing 77A of the electrical circuit module 77 has a shape that does not overlap with the cabin 105. The casing 77A in this example has an "L-shaped" form where two roughly cuboid shapes of different sizes are connected. The casing 77A has a portion (a relatively small, roughly cuboid-shaped portion) higher than the lower end 78A of the entrance to the cabin 105, between the cabin 105 and the front wheel 104F.

The upper end 78B of the battery pack 80 inside the casing 77A is at a lower position than the lower end 78A of the entrance to the cabin 105. The entire battery pack 80 is relatively heavy compared to other electrical circuit components, thus contributing to lowering the vehicle's center of gravity. On the other hand, the upper end 78C of a portion the electrical circuits 89 is at a higher position than the lower end 78A of the entrance to the cabin 105. This configuration contributes to the efficient use of free space in the agricultural tractor. The lower end 78D of the casing 77A of the electrical circuit module 77 is at a lower position than the axle (front axle) 104FX of the front wheel 104F. This allows for expansion of the volume of the casing 77A. Additionally, it is preferable that the support 79 is formed from a sturdy material so that it can function to protect the casing 77A.

In this manner, the electrical circuit module 77 in this example is placed effectively utilizing the free space available in the agricultural tractor 300. In a conventional agricultural tractor with an internal combustion engine as the power source, the space where liquid fuel tanks and similar components, would have been placed is not required in an agricultural tractor including an FC power generation system. Therefore, by positioning the electrical circuit module 77 in the free space where the fuel tank was, it is possible to efficiently house the necessary electrical circuits without increasing the vehicle length and width.

Note that to cool the electrical components inside the electrical circuit module 77, in this example, the coolant flow path described with reference to FIG. 4 is also provided inside the casing 77A of the electrical circuit module 77.

According to this example, it is possible to integrate a group of circuits (a plurality of electronic components)

within a specific area, thereby shortening the length of wiring needed to connect these electronic components. Shortening the wiring reduces electrical resistance and also reduces or prevents noise intrusion. Additionally, by positioning heavy electrical equipment such as battery packs below the cabin 105, it is possible to lower the position of the vehicle's center of gravity, contributing to improved driving stability.

The technologies of this disclosure can be applied to work vehicles such as agricultural tractors, riding field management vehicles, and vegetable transplanting machines.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural tractor comprising:
a vehicle frame; and
a front housing supported by the vehicle frame and including:
a fixed housing portion fixed to the vehicle frame; and
a movable housing portion supported by the vehicle frame or the fixed housing portion, the movable housing portion being openable and closeable and pivotally supported in front of the fixed housing portion; wherein
a dimension of the movable housing portion in a front-back direction is greater than a dimension of the fixed housing portion in the front-back direction;
the movable housing portion houses a fuel-cell module;
the fixed housing portion houses a radiator device; and
the front housing includes at least one opening portion configured to guide cooling airflow therethrough.

2. The agricultural tractor according to claim 1, wherein the fixed housing portion houses a component having a size exceeding a capacity of the movable housing portion.

3. The agricultural tractor according to claim 2, wherein a maximum width inside the fixed housing portion is larger than a maximum width inside the movable housing portion.

4. The agricultural tractor according to claim 1, wherein the fixed housing portion is behind the movable housing portion.

5. The agricultural tractor according to claim 4, wherein
the fixed housing portion includes a front wall on a side of the movable housing portion; and
the front wall includes an opening portion communicating with an interior of the movable housing portion in a closed state.

6. The agricultural tractor according to claim 4, wherein
the vehicle frame supports a driver seat and a handle stay cover with a steering wheel in front of the driver seat; and
the fixed housing portion is in front of the handle stay cover.

7. The agricultural tractor according to claim 6, further comprising:
a cabin surrounding the driver seat and the handle stay cover; wherein
the fixed housing portion is in front of the cabin.

8. The agricultural tractor according to claim 1, further comprising:
a fuel cell power generation system including a fuel cell stack of the fuel-cell module and housed in the movable housing portion.

9. The agricultural tractor according to claim 8, wherein the fixed housing portion houses a device included in the fuel cell power generation system.

10. The agricultural tractor according to claim 9, wherein the device housed in the fixed housing portion is the radiator device to dissipate heat from coolant for the fuel cell stack.

11. The agricultural tractor according to claim 1, wherein the movable housing portion is rotatable about a rotation axis located at a front end of the movable housing portion so as to swing upward and forward away from the fixed housing portion between a closed position and an open position.

* * * * *